US011818644B2

(12) United States Patent
Cheong et al.

(10) Patent No.: US 11,818,644 B2
(45) Date of Patent: Nov. 14, 2023

(54) DOCK-ASSISTED SYSTEM AND METHOD OF DIVERSIFYING DUAL-BAND SIMULTANEOUS COMMUNICATIONS

(71) Applicant: Dell Products, LP, Round Rock, TX (US)

(72) Inventors: Minho Cheong, Round Rock, TX (US); Vivek Viswanathan Iyer, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 20 days.

(21) Appl. No.: 17/204,417

(22) Filed: Mar. 17, 2021

(65) Prior Publication Data

US 2022/0303863 A1 Sep. 22, 2022

(51) Int. Cl.
*H04W 28/08* (2023.01)
*H04W 40/12* (2009.01)
*H04L 45/121* (2022.01)
*H04L 45/00* (2022.01)
*H04L 45/122* (2022.01)

(52) U.S. Cl.
CPC ........... *H04W 40/12* (2013.01); *H04L 45/121* (2013.01); *H04L 45/122* (2013.01); *H04L 45/20* (2013.01)

(58) Field of Classification Search
CPC ..... H04W 48/16; H04W 74/04; H04W 84/18; H04W 72/0426; H04W 72/12; H04W 84/10; H04W 48/06; H04W 84/12; H04W 28/08; H04W 8/04; H04W 24/02; H04W 28/0236; H04W 48/20; H04L 47/10; H04L 47/125

USPC ......................................................... 370/329
See application file for complete search history.

(56) References Cited

U.S. PATENT DOCUMENTS

| 8,254,992 B1 | 8/2012 | Ashenbrenner |
| 8,320,949 B2 | 11/2012 | Matta |
| 8,374,157 B2 | 2/2013 | Tamir |

(Continued)

OTHER PUBLICATIONS

Microsoft, "Windows Filtering Platform Architecture Overview," 1 page, Apr. 20, 2017 https://msdn.microsoft.com/en-US/library/windows/hardware/ff571066(v=vs.85).aspx.

*Primary Examiner* — Man U Phan
(74) *Attorney, Agent, or Firm* — Prol Intellectual Property Law, PLLC; H. Kenneth Prol

(57) ABSTRACT

An information handling system operating a dock assisted dual-band simultaneous (DBS) communication diversity system may comprise a processor to identify a plurality of latency—sensitive software applications currently executing at the processor, and to identify an optimized wireless link configuration dedicating each of a plurality of optimized links between the information handling system and a network access point (AP), or between the information handling system and a docking station to electronic communications transceived pursuant to execution of one of the plurality of software applications prioritizing minimized latency, and a network interface device transceiving data via a plurality of optimized links with the AP and the docking station according to the optimized wireless link configuration, wherein the plurality of optimized links includes at least one optimized wireless link to the AP to decrease a number of wireless hops required to transceive packets from the information handling system to the AP.

20 Claims, 6 Drawing Sheets

(56) References Cited

U.S. PATENT DOCUMENTS

| | | | |
|---|---|---|---|
| 8,472,436 B2 | 6/2013 | Meiri | |
| 9,391,762 B2 | 7/2016 | Rousu | |
| 9,436,643 B2* | 9/2016 | Dees | H04M 1/72412 |
| 9,462,472 B2* | 10/2016 | Liu | H04W 12/062 |
| 9,844,069 B2 | 12/2017 | Gao | |
| 9,942,379 B2* | 4/2018 | Huang | H04M 1/72412 |
| 9,961,696 B2* | 5/2018 | Wang | H04W 72/1215 |
| 10,470,198 B2 | 11/2019 | Sahin | |
| 10,674,555 B2* | 6/2020 | Bang | H04W 4/08 |
| 10,721,622 B2* | 7/2020 | Dees | H04W 12/08 |
| 10,743,358 B1* | 8/2020 | Mullati | H04W 88/06 |
| 10,757,561 B2* | 8/2020 | Reshef | H04W 76/14 |
| 10,972,379 B2* | 4/2021 | Adhikari | H04L 43/08 |
| 11,140,457 B1* | 10/2021 | Jordan | H04N 21/64707 |
| 11,341,075 B2* | 5/2022 | Hamlin | H04W 48/20 |
| 2015/0334598 A1 | 11/2015 | Duo | |
| 2016/0085713 A1* | 3/2016 | Glik | H04W 76/14 |
| | | | 710/304 |
| 2019/0208424 A1* | 7/2019 | Egner | H04W 24/02 |
| 2022/0132531 A1* | 4/2022 | Ko | H04W 28/0278 |
| 2022/0159664 A1* | 5/2022 | Cheong | H04W 56/001 |
| 2022/0201577 A1* | 6/2022 | Narula | H04W 36/22 |
| 2022/0210627 A1* | 6/2022 | Peng | H04L 67/025 |
| 2022/0210767 A1* | 6/2022 | Yang | H04W 72/51 |

\* cited by examiner

DOCK-ASSISTED SYSTEM AND METHOD OF DIVERSIFYING DUAL-BAND SIMULTANEOUS COMMUNICATIONS

FIELD OF THE DISCLOSURE

The present disclosure generally relates to information handling systems and more specifically relates to information handling systems, including mobile computing devices and wired or wireless docking stations that facilitate wireless connectivity to network access points (APs).

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may conduct one or more forms of wireless network communication.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
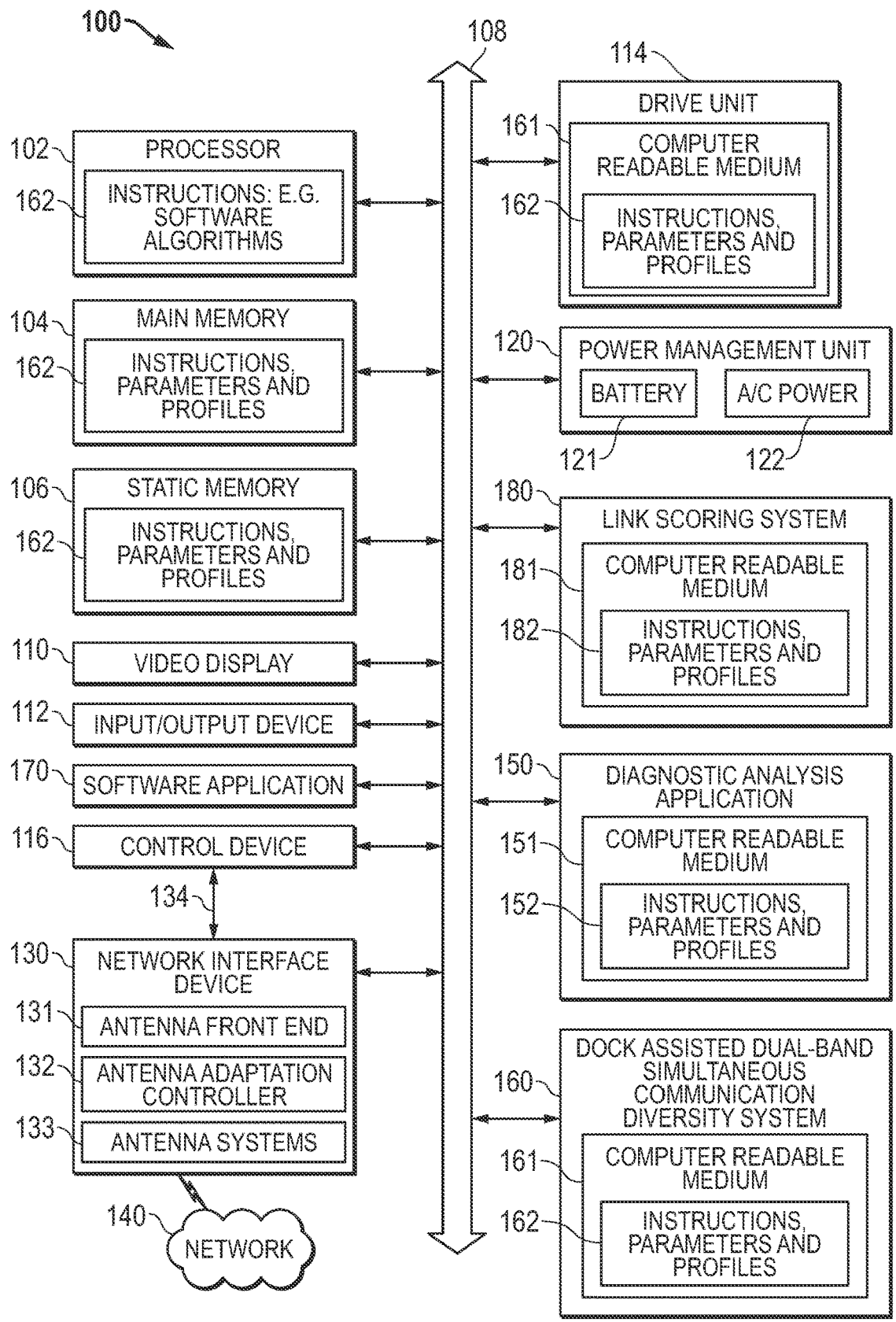
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems such as, for example, laptop/notebook computing devices, tablet computing devices, mobile phones, or other endpoint computing devices known in the art, often utilize wireless networks in order to enable mobility of those endpoint computing devices while exchanging data, as well as to exchange data from remote locations. Such mobile computing devices may communicate via one or more wireless links established between an antenna system of the mobile computing device and a network access point (AP), for example. APs may be capable of establishing several such wireless links with, and thus granting network access to a plurality of wireless devices simultaneously. For example, an AP may communicate via a number of Wi-Fi channels, with each channel comprising a subset of frequencies within an established or standardized Wi-Fi frequency band (e.g., channels 1-11 established within the 2.4 GHz frequency band, or channels 36-165 in the 5 GHz frequency band). Multiple computing devices may communicate with the AP within a single Wi-Fi channel by allotting specific time slots in which each of these computing devices may communicate via a given channel. As the number of devices with which such an AP has established wireless (or wired) links increases, increased traffic at the AP may decrease the speed or quality of transmissions, or volume of data that can be transferred via any of the individual wireless links. This may be reflected as increased network contention between multiple computing devices to access the network via the same AP channel, or increased traffic load (e.g., ratio of idle time to time spent actively transceiving) on any given AP channel.

One way to increase the speed, quality, or total volume of data transferred via wireless communications between any given mobile computing device and such a network access point (AP) may involve increasing the number of wireless links established between the mobile computing device and the AP. For example, if the wireless link established between the AP and a specific mobile computing device within a first channel experiencing high loading or contention results in slower transmission of data with the network, the mobile computing device may increase the speed at which it can transceive data by also transceiving on a second channel (e.g., preferably a channel experiencing lower loading or contention). A second antenna may be added to a mobile computing device, allowing the mobile computing device to establish one wireless link per antenna, with each link transceiving in a separate frequency band (e.g., 2.4 GHz, 5 GHz, 6 GHz, or 60 GHz), and thus on separate channels.

Embodiments of the present disclosure may address this issue by utilizing mobile computing devices that are enabled for dual-band simultaneous (DBS) communications. Analogous to adding a second lane to a road, adding a second wireless link for communication between the mobile computing device and the AP in such a way may decrease traffic on any single wireless link between the AP and the mobile computing device by distributing the data being transceived across both wireless links. This may consequently increase the speed and quality (e.g., fewer dropped packets) at which this data is transceived.

DBS-enabled mobile computing devices may include a controller directing operation of all antennas, and instructing the frequency at which each of the antennas transceives data at any given time. However, many mobile computing devices are not enabled for DBS communications, due to cost, system requirements, or form-factor restrictions. In embodiments described herein, mobile computing devices that are not DBS-enabled may still effectively add an antenna by utilizing an antenna of a docking station with which the mobile computing device is in communication (e.g., via wired or wireless connection). For example, a mobile computing device having only one antenna for Wi-Fi communication may establish a direct wireless connection to the AP via this single antenna, and also connect to a docking station via a wired connection. The mobile computing device in embodiments may then enlist an antenna at the docking station to establish a wireless link with the AP. The docking station in embodiments may then act as a router or tunnel for communications between the mobile computing device and the AP, thus providing a second wireless link (e.g., in addition to the direct link between the mobile computing device antenna and the AP) between the mobile computing device and the AP.

Another way to increase the speed, quality, or total volume of data transferred via wireless communications between a mobile computing device and an AP may involve tailoring operations of the available antenna(s) to best suit the current needs of the mobile computing device. For example, a mobile computing device may be currently executing throughput-sensitive software applications that require the transceiving of large volumes of data in order to perform well, or latency-sensitive software applications that require the rapid (e.g., low latency) transceiving of data in order to perform well. In still other examples, some mobile computing devices may be simultaneously executing a mixture of such throughput-sensitive or latency-sensitive software applications. The performance of one or more of these types of software applications, as executed at the mobile computing device may be optimized in embodiments of the present disclosure by tailoring the performance of one or more antennas of the mobile computing device to transceive data under conditions most suitable for those applications. For example, the performance of a throughput-sensitive application may be optimized at the mobile computing device in embodiments described herein by instructing an antenna to transceive data pursuant to execution of the throughput-sensitive application on a wireless link having a high throughput (e.g., data transmission rate) measurement. For example, such a throughput measurement may be made in comparison with other available wireless links via other antennas, via direct communication with the AP, indirect communication via the docking station, or at varying frequencies. End-to-end throughput of all wired and wireless links connecting the mobile computing device to the AP in the case where multiple links are used to provide such communications may also be considered when identifying a high-throughput route.

As another example, in embodiments, the performance of a latency-sensitive application may be optimized at the mobile computing device by instructing an antenna to transceive data pursuant to execution of the latency-sensitive application on a wireless link having a low latency (e.g., total time for transmission) measurement. End-to-end latency of all wired and wireless links connecting the mobile computing device to the AP in the case where multiple links are used to provide such communications may also be considered when identifying a low-latency route. Hybrid configurations of multiple wireless links in embodiments may allow for optimization of a first wireless link for a throughput-sensitive application and optimization of a second wireless link for a latency-sensitive application.

In embodiments of the present disclosure, the dock-assisted dual-band simultaneous (DBS) communication diversity system may gather scores for each of a plurality of wireless links established between the mobile computing system and the AP, and between the docking station and the AP, on a variety of channels and frequency ranges. For example, the dock-assisted DBS communication diversity system may receive link scores for each of the wireless links established between the docking station and the AP, as generated by a link scoring system operating at the docking station. As another example, a link scoring system operating at the mobile computing device in an embodiment may generate such link scores for each of the wireless links established between the mobile computing device and the AP. In some embodiments, the link scoring system operating at the mobile computing device may also generate such link scores for wireless links established between the mobile computing device and the docking station. Such link scores may reflect or describe certain performance metrics for each of these wireless links.

In previous systems, performance metrics for wireless links gauge traffic and quality of data transmission via any given wireless link using a limited range of performance metrics. For example, most previous systems concentrate primarily on the traditionally measured relative single strength indicator (RSSI) of a given wireless link to determine quality of the link. However, RSSI measurements do not take into account performance metrics such as network contention and network loading on each of the channels in which these wireless links may be established. This may be the case, for example, because older computing devices were not capable of switching antennas between different frequency bands, or of establishing wireless links in a plurality of such frequency bands (e.g., as enabled by DBS communications).

Embodiments of the present disclosure address this issue by generating link scores for each of the available wireless links that take into account such network contention and network loading considerations. For example, the link scores generated by the link scoring system (e.g., operating at the mobile computing device or at the docking system) may generate scores for network contention and network load, both of which may affect network latency and throughput. These link scores may further analyze traffic parameters specific to optimized performance of certain software applications currently executing at the mobile computing device. For example, the link scores generated by the link scoring system (e.g., operating at the mobile computing device or at the docking system) may generate scores for high data rate or throughput. An example of such a link scoring system in embodiments may include Dell® Smartconnect Other scores generated by the link scoring system in embodiments may include identification of the network as private, identification of the network as supporting multi-user, multiple input, multiple output (MU-MIMO) communications, and link quality (e.g., RSSI). A blended score for each wireless link may be generated by the link scoring system in embodiments based on a combination of each of these above described scores, and depending on the relative needs of the mobile device or operating software applications.

The dock-assisted DBS communication diversity system in embodiments may also gather performance requirements or performance metrics for one or more software applications executing at the mobile computing system at any given time. For example, a diagnostic analysis application executing at the mobile computing system may gather performance metrics describing how each program consumes resources and identifies opportunities for optimization. More specifically, the diagnostic analysis application may be capable of determining the volume of data transceived pursuant to execution of a given application, or sensitivity of a given application to network latency. The diagnostic analysis application may also access latency requirements for software applications executing at the mobile computing system, defining one or more such software applications as latency-sensitive. The Dell® Optimizer® software program may be one example of such a diagnostic analysis application.

In embodiments, the dock-assisted DBS communication diversity system may then optimize the configuration of available wireless links for transceiving data pursuant to execution of the currently executing software applications. For example, the dock-assisted DBS communication diversity system in embodiments may dedicate a wireless link exhibiting the low relative latency or an acceptably low latency level to transceiving data pursuant to execution of a latency-sensitive application. As another example, the dock-assisted DBS communication diversity system may dedicate a wireless link exhibiting a high relative throughput or an acceptably high relative throughput level in embodiments to transceiving data pursuant to execution of a throughput-sensitive application. These are only two examples of performance and traffic metrics for which a plurality of wireless links may be optimized. Embodiments also contemplate the tailoring of wireless links to optimize performance of software applications sensitive to other known performance or traffic metrics, including, for example, Quality of Service (QoS), interference, number of dropped packets, security, reliability, availability, or connectivity.

Examples of optimized configurations in embodiments described herein may leverage multiple antennas at the information handling system to establish a plurality of links directly with the AP or indirectly via the docking station connected to the AP via a backhaul connection. Optimized configurations may also define the channels upon which one or more of these wireless links operates, or may dedicate one or more of these wireless links to communications transceived pursuant to software applications currently executing at the information handling system in order to optimize performance of these software applications. In such a way, the dock-assisted DBS communication diversity system may automatically identify and establish a plurality of optimal wireless links selected to optimize performance of one or more software applications currently executing on a mobile computing system in communication with a docking station and an AP.

FIG. 1 illustrates an information handling system 100 according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile computing device, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palm-top computer, a laptop computer, a tablet computer, a desktop computer, an augmented reality system, a virtual reality system, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

In an embodiment, the information handling system may include a dock-assisted dual-band simultaneous (DBS) communication diversity system 160 that may be any device or devices that execute instructions, parameter, and profiles 162 so that wireless links may be established with the network 140 according to a configuration determined to optimize performance of software applications 170 executing at the processor 102, as described herein. The information handling system 100 may include a memory 104, (volatile (e.g. random-access memory, etc.), nonvolatile memory (read-only memory, flash memory etc.) or any combination thereof), one or more processing resources, such as a central processing unit (CPU), a graphics processing unit (GPU), either of which may be the processor 102 illustrated in FIG. 1, hardware or software control logic, or any combination thereof. Additional components of the information handling system 100 may include one or more storage devices 106 or 114, a control device 116, a network interface device 130, one or more communications ports for communicating with external devices, as well as, various input and output (I/O) devices 112, such as a keyboard, a mouse, or any combination thereof. A power management unit 120 supplying power to the information handling system 100, via a battery 121 or an alternating current (A/C) power adapter 122 may supply power to one or more components of the information handling system 100, including the processor 102, the network interface device 130, and the control device 116.

The information handling system 100 may further include a video display 110. The video display 110 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may execute code instructions 162 that may operate on servers or systems, remote data centers, or on-box in individual client information handling systems 100 according to various embodiments herein. In some embodiments, it is understood any or all portions of code instructions 162 may operate on a plurality of information handling systems 100.

The information handling system 100 may include a processor 102 such as a central processing unit (CPU), a GPU, embedded controllers or control logic or some combination of the same. Any of the processing resources may operate to execute code that is either firmware or software code. Moreover, the information handling system 100 may include memory such as main memory 104, static memory 106, containing computer readable medium 161 storing instructions 162. Instructions 162 may include a dock-assisted DBS communication diversity system 160, operating system (OS) software, application software, BIOS software, or other software applications or drivers detectable by processor type 102. The disk drive unit 114 and static memory 106 may also contain space for data storage. The instructions 162 in an embodiment may reside completely, or at least partially, within the main memory 104, the static memory 106, and/or within the disk drive 114 during execution by the processor 102. The information handling system 100 may also include one or more buses 108 operable to transmit communications between the various hardware components such as any combination of various input and output (I/O) devices, display 110, or the network interface device 130, or the like.

Information handling system 100 in an embodiment may comprise a mobile computing device, such as a laptop or tablet computer, as described in greater detail herein, or may, in some embodiments, comprise a docking station for such a mobile computing device. The information handling system 100 in such an embodiment may operate on wired and wireless links to connect with the network 140 via a network Access Point (AP), as described in greater detail herein.

The network interface device 130 may be communicatively coupled to the controller 116 via bus 108 or via a separate communication line 134, which may support one or more protocols for routing packets/frames between or among network interface devices via a software defined network (SDN) controller 116, such as, for example, the OpenFlow® protocol, or the Interface to the Routing System (i2rs) protocol. It is contemplated that communication lines 134 or bus 108 may support any other currently known or later developed protocols for control of a network interface device by an SDN controller 116. The SDN controller 116 in an embodiment may include, for example, an OpenDaylight® controller, a Nicira® Networks/VMWare® NOX™ controller, a NTT®/Google® ONIX® controller, the NEC® Trema® controller, the NTT® Ryu® controller, or open-sourced controllers such as PDX or Beacon controllers. In some embodiments, the SDN controller 116 may comprise a software-defined wide-area network (SD-WAN) controller operating to unify networking connections covering a wide geographical area within an enterprise.

The network interface device 130 may provide connectivity of the information handling system 100 to the network 140 via a network AP in an embodiment. The network 140 in some embodiments may be a wired local area network (LAN), a wireless personal area network (WPAN), a public WiFi communication network, a private WiFi communication network, a public WiMAX communication network, or other non-cellular communication networks. In other embodiments, the network 140 may be a wired wide area network (WAN), a private LTE communication network, a 4G LTE public communication network, or a 5G millimeter-wave (mm-wave) communication network, or other cellular communication networks. Connectivity to any of a plurality of networks 140, one or more APs for those networks, or to a docking station in an embodiment may be via wired or wireless connection. In some aspects of the present disclosure, the network interface device 130 may operate two or more wireless links. In other aspects of the present disclosure, the information handling system 100 may include a plurality of network interface devices, each capable of establishing a separate wireless link to network 140, such that the information handling system 100 may be in communication with network 140 via a plurality of wireless links.

The network interface device 130 may operate in accordance with any cellular wireless data communication standards. To communicate with a wireless local area network, standards including IEEE 802.11 WLAN standards, IEEE 802.15 WPAN standards, WiMAX, or similar wireless standards may be used. Utilization of radiofrequency communication bands according to several example embodiments of the present disclosure may include bands used with the WLAN standards which may operate in both licensed and unlicensed spectrums. For example, WLAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band, or a 60 GHz band.

The network interface device 130, in other embodiments, may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WWAN standards, which may operate in both licensed and unlicensed spectrums. More specifically, the WWAN interface device 150 in an embodiment may transceive within radio frequencies associated with the 5G New Radio (NR) Frequency Range 1 (FR1) or Frequency Range 2 (FR2). NRFR1 may include radio frequencies below 6 GHz, associated with 4G LTE and other standards predating the 5G communications standards. NRFR2 may include radio frequencies above 6 GHz, made available within the emerging 5G communications standard. Communications within NRFR1 may be enabled through the use of either an eNodeB executing an evolved packet core of an existing LTE system, or a Next Generation Node B (gNodeB) executing the next generation packet core of the 5G cellular standard.

Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands. WWAN may use the Unlicensed National Information Infrastructure (U-NII) band which typically also may operate in the ~5 GHz frequency band. It is understood that any number of available channels may be available under the 5 GHz shared communication frequency band. WWAN may operate in a number of bands, some of which are proprietary but may include a wireless communication frequency band at approximately 2.5 GHz band for example. In additional examples, WWAN carrier bands may operate at frequency bands of approximately 700 MHz, 800 MHz, 1900 MHz, or 1700/2100 MHz for example as well.

In an embodiment, the network interface device 130 may be communicatively coupled to an array of antenna systems 133 used to provide a plurality of separate communication channels to the network 140. Such communications channels may be found in any communication network described herein. The antennas 133 may support a 5G wireless communication protocol so that relatively higher amounts of data may be transceived by the information handling system 100 to any communication network to which the information handling system 100 is communicatively coupled in some embodiments.

The antenna adaptation controller 132 may execute instructions as disclosed herein for monitoring wireless link state information, wireless link configuration data, network slice data, or other input data to generate channel estimation and determine antenna radiation patterns. For example, the antenna adaptation controller 132 in an embodiment may gather beacon data received from one or more nearby access points (APs) for the network 140 describing channels available for communication with that AP, as well as various current traffic metrics for communications on those channels. More specifically, such beacon information may provide a relative signal strength indicator (RSSI), identification of the network 140 as private or public, identification of the network 140 as compatible with multiple user, multiple input, multiple output (MU-MIMO) communications, high available data rate, levels of channel contention, and current load of communications at the AP. Such beacon data may include such measurements or indications for each of the channels within which the AP is capable of transceiving data, and the beacons may be received in regular intervals. Such received beacon data may be stored in an embodiment at the main memory 104, or in temporary BIOS memory accessible in kernel mode. Instructions or a controller may execute software or firmware applications or algorithms which utilize one or more wireless links for wireless communications via the network interface device 130 and the plurality of antenna systems 133 for the plurality of supported wireless protocols as well as other aspects or components.

The network interface device 130 in an embodiment may further include an antenna front end system 131 which may operate to modulate and demodulate signals transceived within a WWAN or WLAN format, set signal transmission power levels or sensitivity to signal reception, select channels or frequency bands, and conduct other functions in support of a wireless transmission from the information handling system 100 to the communication network 140. In one aspect of an embodiment, the antenna front end 131 may receive communication packets or frames from the controller 116 and instructions to forward those frames to the network 140 within a specified radio frequency spectrum sub-portion (e.g., 5G NRFR1 low-band below 1 GHz, 5G NRFR1 mid-band between 1 GHz and 6 GHz, or 5G NRFR2 high-band above 6 GHz). In another aspect of an embodiment, the antenna front end 131 may receive communication packets or frames from the network 140 within a specified radio frequency spectrum sub-portion (e.g., 5G NRFR1 low-band below 1 GHz, 5G NRFR1 mid-band between 1 GHz and 6 GHz, or 5G NRFR2 high-band above 6 GHz) and forward the received frames to the controller 116, along with an identification of the radio frequency at which the frames were received.

The SDN controller 116 in an embodiment may operate, in part, to route data transceived pursuant to execution of one or more software applications 170 currently executing at the processor 102 via a specifically identified wireless link such that the data is only transceived within a radio frequency sub-portion assigned to that software application 170 currently executing at the processor 102 by the dock assisted DBS communication diversity system 160. The SDN controller 116 in an embodiment may operate in a control plane layer (e.g., via software), in part, to route incoming packets/frames to a network interface device for transmission in a specific network slice, or on a specific channel. For example, the SDN controller 116 may operate to receive packets or frames generated pursuant to execution at the processor 102 of a specifically identified software application 170, and route those frames to the network interface device 140 for transmission within a preset or identified radio frequency sub-portion (e.g., network slice) assigned to the software application 170 currently executing at the processor 102. Similarly, the SDN controller 116 may retrieve packets or frames received at the network interface device 130 within the preset or identified radio frequency sub-portion (e.g., network slice or channel) assigned to the software application 170 currently executing a the processor 102 and transmit the data encapsulated within the received packet or frame to the software application 170 associated with that preset or identified radio frequency sub-portion by the dock assisted dual-band simultaneous communication diversity system 160. In such a way, the SDN controller 116 may cause data frames or packets generated or received pursuant to the current execution of the software application 170 at the processor 102 to be transceived via the network interface device 130 within a specific network slice or specifically identified radio frequency sub-portion (e.g., channel). Reservation of a given channel or network slice for transceiving of data pursuant to execution of the software application 170 may represent a software-driven distinction between various frequency bands, rather than any specific hardware separate and apart from the network interface device 130. Software application 170 may be designated as throughput-sensitive or latency-sensitive according to various embodiments and paired with a particular wireless link suitable for that software application 170 and depending on the arrangement of the information handling system and operative connectivity to a docking station.

The dock-assisted DBS communication diversity system 160 in an embodiment may establish a plurality of wireless links, with each link transceiving in a separate channel, frequency band, or network slice, and each reserved for transceiving of data pursuant to execution of software applications (e.g., 170) currently executing at the processor 102. Each of these wireless links in an embodiment may enable communication in a separate network slice via a single radio of the network interface device 130. For example, a first wireless link in an embodiment may transceive in the 2.4 GHz Wi-Fi frequency band, and a second wireless link may transceive in the 5 GHz Wi-Fi frequency band. As another example, a first wireless link in an embodiment may transceive in the 6 GHz Wi-Fi frequency band, and a second wireless link may transceive in the 60 GHz Wi-Fi frequency band. As yet another example, a first wireless link in an embodiment may transceive on channel one of the 2.4 GHz band, and a second wireless link may transceive on channel eleven in the 2.4 GHz Wi-Fi frequency band. These are only two examples of available but separate radio frequency spectrum sub-portions or network slices, and, as described above, the network interface device may be capable of transceiving via the wireless links in accordance with any cellular wireless data communication standards.

The SDN controller 116 in an embodiment may also operate, in part, to process and forward received communications between the software application 170 and the network interface device 130 operating according to different communication standards. For example, the SDN controller 116 in an embodiment may operate to receive communication packets via a wireless link transceiving in a frequency sub-range (e.g., channel or network slice) assigned to the software application 170. A packet processing management system of the SDN controller 116 in such an embodiment may process those received packets for routing to the software application 170. In another example, the SDN controller 116 may operate to receive communications packets from the software application 170, and the packet processing management system of the SDN controller 116 may process those received packets for transmission within the frequency sub-range (e.g., channel or network slice) assigned to that software application 170. The SDN controller 116 may operate, at least in part, in kernel mode, or as a kernel mode driver, to direct operations of the network interface device 230, antenna front end 231, or antenna systems 233.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 162 or receives and executes instructions, parameters, and profiles 162 responsive to a propagated signal, so that a device connected to a network 140 may communicate voice, video or data over the network 140. Further, the instructions 162 may be transmitted or received over the network 140 via the network interface device 130. The information handling system 100 may include a set of instructions 162 that may be executed to cause the computer system to perform any one or more of the methods or computer-based functions disclosed herein. For example, instructions 162 may include a particular example of a dock assisted DBS communication diversity system 160, or other aspects or components. Various software modules comprising application instructions 162 may be coordinated by an operating system (OS), and/or via an application programming interface (API). An example operating system may include Windows®, Android®, and other OS types. Example APIs may include Win 32, Core Java API, or Android APIs. Application instructions 162 may also include any application processing drivers, or the like executing on information handling system 100. Other examples of instructions 162 may include software applications 170, diagnostic analysis application 150, or link scoring system 180, among others according to various embodiments herein.

The dock-assisted DBS communication diversity system 160 may utilize a computer-readable medium 161 in which one or more sets of instructions 162 such as software may be embedded. The instructions 162 may embody one or more of the methods or logic as described herein. For example, instructions relating to the dock-assisted DBS communication diversity system 160, software algorithms, processes, and/or methods may be stored here. As explained, some or all of the dock-assisted DBS communication diversity system 160 may be executed locally or remotely.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The instructions, parameters, and profiles 162 of the dock-assisted DBS communication diversity system 160 may be stored in static memory 106, or the drive unit 114 on a computer-readable medium 161 such as a flash memory or magnetic disk in an example embodiment. While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magnetooptical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the dock-assisted DBS communication diversity system 160 that may be operably connected to the bus 108. The dock-assisted DBS communication diversity system 160 may, according to the present description, perform tasks related to establishing a configuration of wireless links to the network 140 to optimize performance of one or more software applications (e.g., 170) currently executing at the processor 102. As part of this process, the dock-assisted dual-band simultaneous (DBS) communication diversity system 160 may gather scores for each of a plurality of wireless links established between the information handling system 100 and an AP of network 140, on a variety of channels and frequency ranges. In an embodiment in which the information handling system 100 comprises a mobile computing device such as a laptop or tablet computer, the dock-assisted DBS communication diversity system 160 may also receive, via the network interface device 130 or network 140, scores for each of a plurality of wireless links established between a docking station communicably coupled to the information handling system 100 and the network 140. These scores received from the docking station in such an embodiment may be generated by a version or agent of the dock-assisted DBS communication diversity system 160 operating thereon. In an embodiment in which the information handling system 100 comprises a docking station communicably coupled to a mobile computing device, the dock-assisted DBS communication diversity system 160 may also receive, via the network interface device 130 or network 140, scores for each of a plurality of wireless links established between the mobile computing device such as a laptop or tablet computer communicably coupled to the information handling system 100 and the network 140. These scores received from the mobile computing device such as a laptop or tablet computer in such an embodiment may be generated by a version or agent of the dock-assisted DBS communication diversity system 160 operating thereon.

In such a way, the dock-assisted DBS communication diversity system 160 operating at either the docking station or the communicably coupled mobile computing device may receive link scores for each of the wireless links established between the docking station and an AP for network 140, and for each of the wireless links established between the mobile computing device and the AP for network 140. Additionally, such link scores may be determined for a combination of wired or wireless links providing an end-to-end communication route from the mobile computing device (e.g., 100) to the AP for network 140. For example, a link score may be determined for a combination of a wired or wireless link between the mobile computing device and a docking station, and a wired or wireless link between the docking station and the AP of network 140.

A link scoring system 180 in an embodiment may generate such link scores to reflect or describe certain performance metrics for each of these wireless links, and to take into account network contention and network loading considerations. The link scoring system 180 (e.g., operating at the mobile computing device or at the docking system) may access beacon data describing traffic metrics for each channel in which a given AP for the network 140 is capable of transceiving data with the information handling system 100. For example, such beacon data, as received by the antenna adaptation controller 132 in an embodiment may provide a relative signal strength indicator (RSSI) having a value between −150 and −50, identification of the network 140 as private or public, identification of the network 140 as compatible with multiple user, multiple input, multiple output (MU-MIMO) communications, and a high available data rate (e.g., 350 mbps) relative to other data link options. The stored beacon data may also include an indication of whether multiple APs from which the information handling system is receiving beacons are transceiving within the same channel, indicating channel contention. A percentage of time in which the AP is busy transceiving on the channel may also be included within the beacon data, indicating current load of communications at the AP.

Based on these beacon values, the link scoring system 180 in an embodiment may generate weighted and scaled scores for these beacon traffic metrics. Scores associated with some beacon data traffic metrics may be preset and applied on a binary basis. For example, a preset value may be assigned on a binary basis to a given channel based on identification of the network as private or public, identification of the network as MU-MIMO compliant, or whether multiple APs from which the information handling system 100 has received beacons are transceiving on the same channel. In some embodiments, the preset value assigned to each of these factors may be uniform across all information handling systems (e.g., 100), and may not take into account current operating needs for any specific information handling system (e.g., 100). For example, the link scoring system 180 in an embodiment may associate an identification of the network 140 as private with a preset value of five points, identification of the AP for network 140 as MU-MIMO compliant with a preset value of ten points, and determination that no other nearby APs are transceiving on the same channel (e.g., indicating no contention) with a value of fifteen points. The above scores are only examples of preset values assigned to one or more factors. In other embodiments, the preset values may have any value, including whole values, percentage values, or negative values and work with any rating range of values for comparison of wireless links and channels therein. The preset values so assigned may reflect the relative importance of each of these factors to the performance of the software applications (e.g., 170) executing at the information handling system 100.

The relative differences between these point values in an embodiment may indicate a weighted importance of each of these factors in overall communication performance. For example, identification of the AP as MU-MIMO compliant may be associated with a greater weighted value than the identification of the network 140 as private because privacy of the network is less likely to impact speed and quality of communications with the network 140 than the ability of the AP to serve a greater number of users with higher throughput than other APs that are not compliant with MU-MIMO. As another example, indication of no contention on a given channel may be associated with a greater weighted value than either the identification of the network 140 as private or identification of the AP as MU-MIMO compliant because network contention has a more direct and greater impact on both throughput and latency than MU-MIMO compliance.

Other beacon-based traffic metrics may be associated with point values within a preset range of values, based on measured metrics stored in the beacon data. For example, the beacon data may include an RSSI having a value between −150 and −50, a high available data rate as a percentage of a theoretical maximum of 350 mbps, and a measured percentage of time (e.g., between 0% and 100%) in which the AP is not busy transceiving data on a given channel (e.g., load measurement). Each of these measured values may be normalized to a value between zero and one, then weighted, similarly to the method described directly above. For example, the RSSI value may be normalized to a value between zero and one (e.g., described as a percentage), then multiplied by a value of 30, such that a high available RSSI of −50 is associated with a maximum allowable weighted point value of 30 points (e.g., 30 available points multiplied by 100% or 1.00). As another example, a high available data rate, as a percentage of the theoretical maximum data rate of 350 mbps may be weighted by multiplying by a value of 20, such that channels transceiving at a data rate of 350 mbps receive 20 points for this factor (e.g., 20 available points multiplied by 100% or 1.00). In yet another example, the load describing the percentage of time in which the AP is not busy transceiving data on the given channel may be weighted by multiplying by a value of 20, such that channels on which the AP is not busy transceiving data (e.g., 100% free) receive 20 points for this factor.

Again, the relative differences between the maximum achievable point values for each of these factors in an embodiment may indicate a weighted importance of each of these factors in overall communication performance. For example, RSSI may be weighted more heavily than load or maximum data rate in an embodiment because the signal strength indicates an overall health of the wireless link, and must meet a preset threshold value before the network interface device 130 may establish such wireless links. Each of the weighted point values for these factors may be combined, in an embodiment, to give a blended link score between zero and 100. For example, the link scoring system 180 may add the maximum possible point values for each of the above-described beacon-based traffic metrics, including link quality (e.g., 30 points), identification of the network as private (e.g., 5 points), identification of the AP as MU-MIMO compliant (e.g., 10 points), high data rate (e.g., 20 points), channel contention (e.g., 15 points), and channel load (e.g., 20 points) for an overall link score totaling 100 possible points.

In other embodiments, the preset point values attributable to each of these factors may be weighted differently, or the weight may vary based on the sensitivity to software applications (e.g., 170) currently executing at the processor 102 to one or more traffic metrics. For example, traffic factors or metrics affecting latency may be weighted more heavily upon a determination in an embodiment by the dock-assisted DBS communication system 160 that the software application 170 currently executing at the processor 102 is latency-sensitive. In such an embodiment, the link scoring system 180, following instructions from the dock-assisted DBS communication system 160 may increase the weights associated with channel contention and channel load, which both heavily influence latency, and decrease the weights associated with other factors less likely to affect latency (e.g., maximum data rate) to bring the total number of available points to 100 in an example. Any scale can be used according to other embodiments. For example, the link scoring system 180 in such an embodiment may increase the number of points associated with channel load from 20 possible points to 25 possible points, and decrease the number of points associated with maximum data rate from 20 points to 15 points in order to compensate for the increase of five possible points attributable to channel load.

In another example, traffic factors or metrics affecting throughput may be weighted more heavily upon a determination in an embodiment by the dock-assisted DBS communication system 160 that the software application 170 currently executing at the processor 102 is throughput-sensitive. In such an embodiment, the link scoring system 180, following instructions from the dock-assisted DBS communication system 160 may increase the weights associated with identification of the AP as supporting MU-MIMO communications and the maximum data rate, which both heavily influence throughput, and decrease the weights associated with other factors less likely to affect throughput (e.g., channel contention) to bring the total number of available points to 100 in the example described. For example, the link scoring system 180 in such an embodiment may increase the number of points associated with identification of the AP as supporting MU-MIMO from 10 possible points to 15 possible points, and decrease the number of points associated with channel contention from 15 possible points to 10 points in order to compensate for the increase of five possible points attributable to identification of the AP as supporting MU-MIMO.

In yet another embodiment, the link scoring system 180 may output a sub-score for each of these beacon-based traffic metrics in which the sub-scores are weighted uniformly, regardless of performance sensitivities of the applications executing at the information handling system, and the dock-assisted DBS communication diversity system 160 may adjust the weights of each of these sub-scores to generate an adjusted blended link score between zero and 100 in the presently described example scale. In still another embodiment, the link scoring system 180 may transmit normalized but unweighted values for each of these beacon-based traffic metrics to the dock-assisted DBS communication diversity system 160. For example, the link scoring system 180 may transmit a normalized link quality score between zero and one, a value of one or zero to indicate whether the network 140 is private, a value of one or zero to indicate whether the AP is MU-MIMO compliant, a high data rate level as a percentage between one and 100 of the theoretical maximum data rate (e.g., 350 mbps), a value of one or zero to indicate whether the channel is in use by multiple APs, and a percentage between zero and one indicating a percentage of time in which the AP is not busy transceiving data on that channel. The dock-assisted DBS communication diversity system 160 in an embodiment may use any of these contemplated scores or values (e.g., weighted, non-weighted, or weighted based on sensitivities of currently executing software applications) to identify one or more wireless links having traffic metrics optimal for performance of currently executing software applications (e.g., 170).

For example, the link scoring system may determine a link quality score, which is a linear translation of RSSI from a value between −100 and −50 dbm to a normalized value between zero and 30 in an embodiment. As another example, the link scoring system may determine whether the network 140 is a private or public network, and assign an additional five points to wireless links established with private networks. In yet another example, the link scoring system may assign an additional ten points to wireless links established with a network AP that supports MU-MIMO communications, allowing the AP to serve more users with higher throughput. As yet another example, the link scoring system may assign an additional value between zero and twenty, representing a linearly scaled assessment of the ratio of the data rate for the wireless link to the maximum possible data rate (e.g., 350 mbps). In still another example, the link scoring system may assign an additional 15 points when no other nearby APs operate in the same channel in which the wireless link is transceiving.

An example of such a link scoring system 180 in embodiments may include Dell® Smartconnect®. The link scoring system 180 may utilize a computer-readable medium 181 in which one or more sets of instructions 182 such as software may be embedded. The instructions 182 may embody one or more of the methods or logic as described herein. For example, instructions relating to the link scoring system 180, software algorithms, processes, and/or methods may be stored here. As explained, some or all of the link scoring system 180 may be executed locally or remotely.

The dock-assisted DBS communication diversity system 160 in embodiments may also gather performance requirements or performance metrics for one or more software applications (e.g., 170) executing at the information handling system 100 at any given time. For example, a diagnostic analysis application 150 executing at the mobile computing system may gather performance metrics describing how each program consumes resources and identifies opportunities for optimization. More specifically, the diagnostic analysis application 150 may be capable of determining the volume of data transceived pursuant to execution of a given application (e.g., 170), or sensitivity of a given application (e.g., 170) to network latency. The Dell® Optimizer® software program may include one example of such a diagnostic analysis application 150.

The diagnostic analysis application 150 may utilize a computer-readable medium 151 in which one or more sets of instructions 152 such as software may be embedded. The instructions 152 may embody one or more of the methods or logic as described herein. For example, instructions relating to the diagnostic analysis application 150, software algorithms, processes, and/or methods may be stored here. As explained, some or all of the diagnostic analysis application 150 may be executed locally or remotely.

In embodiments, the dock-assisted DBS communication diversity system may optimize the configuration of available wireless links for transceiving data pursuant to execution of the currently executing software applications (e.g., 170). For example, in an embodiment in which the software application 170 is latency-sensitive, the dock-assisted DBS communication diversity system 160 may dedicate a wireless link exhibiting the low relative latency to transceiving data pursuant to execution of application 170. As another example, in an embodiment in which the software application 170 is throughput-sensitive, the dock-assisted DBS communication diversity system 160 may dedicate a wireless link exhibiting a high relative throughput to transceiving data pursuant to execution of application 170. These are only two examples of performance and traffic metrics for which a plurality of wireless links may be optimized. Embodiments also contemplate the tailoring of wireless links to optimize performance of software applications sensitive to other known performance or traffic metrics, including, for example, interference, number of dropped packets, security, reliability, availability, or connectivity.

In an embodiment, the dock-assisted DBS communication diversity system 160 may communicate with the main memory 104, the processor 102, the power management unit 116, the video display 110, the input device 112, the SDN controller 116, and the network interface device 130, via bus 108, and several forms of communication may be used, including ACPI, SMBus, a 24 MHZ BFSK-coded transmission channel, or shared memory. Driver software, firmware, controllers and the like may communicate with applications (e.g., 170) on the information handling system 100, and various hardware systems.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
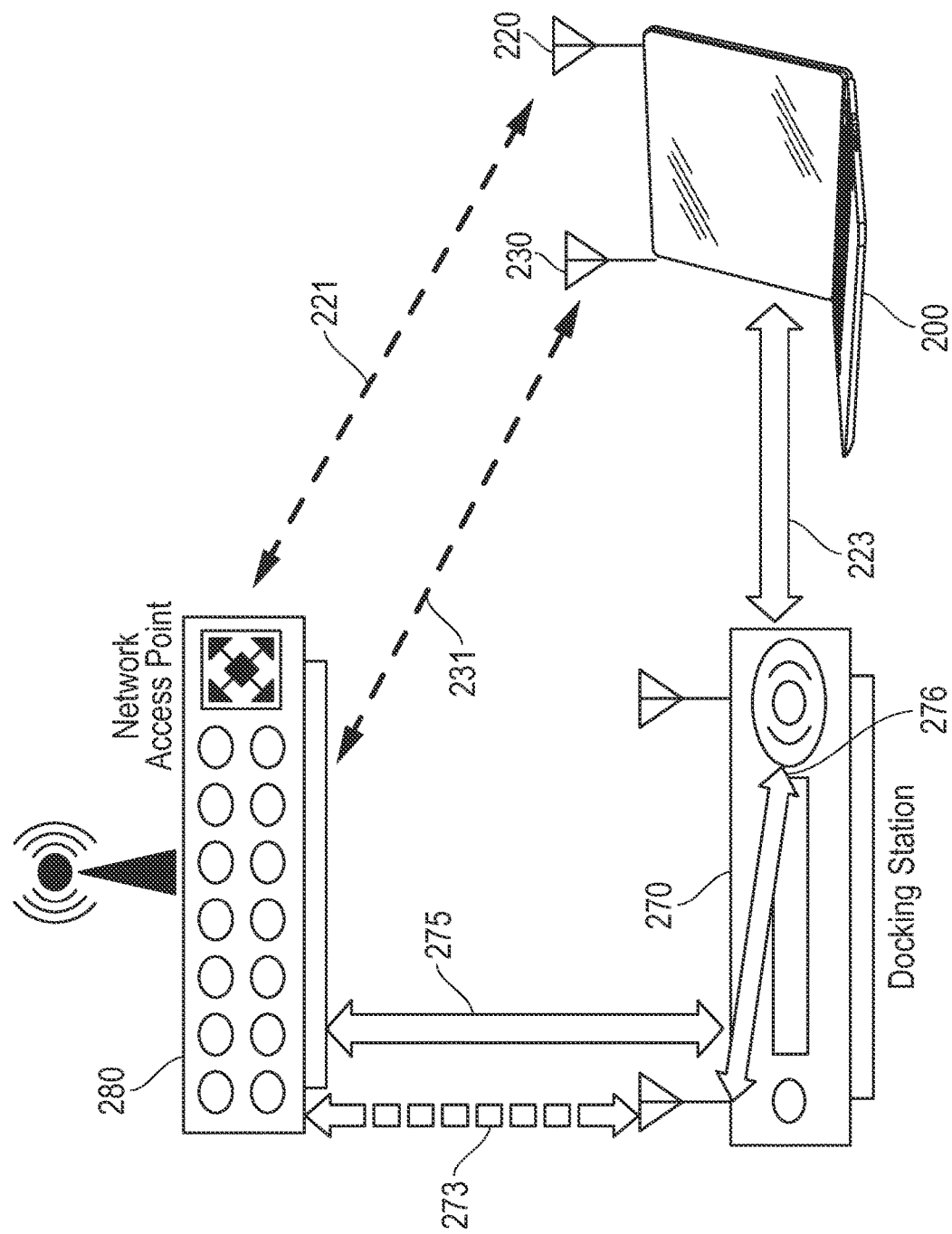
FIG. 2 is a block diagram illustrating an information handling system establishing an optimized configuration of wireless links via a plurality of antennas according to an embodiment of the present disclosure.

FIG. 2 is a block diagram illustrating a DBS-enabled information handling system establishing wireless links according to a configuration determined to optimize performance of currently executing software applications via a plurality of antennas according to a first embodiment of the present disclosure. As described herein, the dock-assisted DBS communication diversity system in an embodiment may increase the speed, quality, or total volume of data transferred via wireless communications between the information handling system and the AP by increasing the number of wireless links established between the information handling system and the AP, or by tailoring the configuration of wireless links so established to optimize performance of one or more software applications currently executing at an information handling system 200. Thus, the wireless configuration determined by the dock-assisted DBS communication diversity system in embodiments to be optimal for the currently executing software applications may depend upon the particular needs of those software applications (e.g., higher throughput, lower latency), and upon the availability of a second antenna at the information handling system 200. FIG. 2 illustrates an optimal wireless link configuration for a DBS-enabled information handling system 200 executing latency-sensitive software applications, and capable of transceiving via a plurality of antennas (e.g., 220 and 230).

The dock-assisted DBS communication diversity system in an embodiment may execute at a DBS-enabled information handling system 200, which may be in communication with a wired or wireless docking station 270, and a network Access Point (AP) 280 via one or more wired or wireless links. The docking station 270 may be in communication with the AP 280 in various embodiments through a wired backhaul 275 or through one or more wireless links (e.g., 273). As described herein, the DBS-enabled information handling system 200 in an embodiment may be capable of establishing two separate wireless links, each via a different antenna located at the information handling system 200, and each transceiving in a separate frequency band or channel. For example, the DBS-enabled information handling system 200 may include a first antenna 220 and a second antenna 230. As also described herein, the docking assisted DBS communication diversity system operating at the information handling system 200 in an embodiment may determine whether to use the second antenna 230 to establish a wireless link directly to the AP 280, or to establish a wireless link with the docking station 270 so as to enable indirect communication with the AP 280 via one or more of the antennas of the docking station 270. In the embodiment illustrated with respect to FIG. 2, in which the information handling system 200 utilizes two separate antennas 220 and 230, the information handling system 200 is capable of establishing two separate wireless links directly to the AP 280. Thus, the information handling system 200 is not required to route communications through the docking station 270 in order to establish two separate links to the AP 280, but is capable of doing so.

In such an embodiment, the dock assisted DBS communication diversity system may determine whether to establish the second wireless link via the second antenna 230 directly with the AP 280 or indirectly through the docking station 270, based on performance requirements or sensitivities of the applications currently executing at the information handling system 200. For example, in an embodiment, the information handling system 200 may be currently executing one or more software applications sensitive to latency, or in which latency may most meaningfully impact performance of the application. As described herein with reference to FIG. 1, the dock-assisted DBS communication diversity system in an embodiment may receive an indication of the sensitivities to currently executing applications at the information handling system 200 via a diagnostic analysis application. As also described herein with reference to FIG. 1, the dock-assisted DBS communication diversity system in an embodiment may receive link scores from a link scoring system describing traffic metrics for all channels upon which the AP 280 is capable of transceiving data. These link scores may describe traffic metrics for communications between the AP 280 and the information handling system 200, as well as communications between the AP 280 and the docking station 270.

The dock-assisted DBS communication diversity system in an embodiment may only consider establishing wireless links on channels associated with a blended link score (e.g., as generated by the link scoring system 180 described with reference to FIG. 1) meeting a preset threshold value. For example, in an embodiment described with reference to FIG. 1 in which the blended link score has a value between zero and 100, the dock-assisted DBS communication diversity system may only assess channels associated with blended link scores of 70 and higher for inclusion within the optimal wireless link configuration described herein. Any threshold value may be used, and in some cases may be preset by the user of the information handling system 200. In other example embodiments, the threshold value may be preset according to learned minimum requirements for execution of software applications currently running at the information handling system 200. In still other embodiments, minimum threshold blended link scores may vary based on operating conditions at the information handling system 200 at any given time.

In an embodiment in which the dock-assisted DBS communication diversity system determines one or more currently executing software applications are sensitive to latency, the dock-assisted DBS communication diversity system operating at the information handling system 200 may determine the optimal wireless link configuration includes both wireless links 221 and 231, established directly between the AP 280 and the information handling system first antenna 220 and second antenna 230, respectively. This may be the case since wireless communication through a direct wireless link between two points requires less time to complete than a wireless communication relayed between those two points by a third agent, thus resulting in lower latency. For example, less time is required to wirelessly transmit a packet from the information handling system 200 to the AP 280 than is required to wirelessly transmit a packet from the information handling system 200 to the docking station 270, then to the AP 280.

When determining an optimal configuration, the dock-assisted DBS communication diversity system in an embodiment may consider end-to-end traffic conditions for configurations requiring more than one wired or wireless link between the information handling system 200 and the AP 280. For example, routing communications through the docking station 270 may include transceiving data through a wired link 276 internal to the docking station 270 between a port at which wired link 223 connects to the docking station 270 and a port connecting the docking station 270 to either wireless link 273 or wired link 275. Transceiving of data via this wired link 276 internal to the docking station 270 may be associated with added latency. Thus, the dock-assisted DBS communication diversity system in an embodiment may determine the combined latencies associated with wired link 223, wired link 276, and either wireless link 273 or wired link 275 is greater than the latency associated with wireless link 231.

Upon dedicating both the first antenna 220 and the second antenna 230 to direct wireless communication with the AP 280, the dock-assisted DBS communication diversity system in an embodiment may also determine an optimal channel in which to transceive data via each of the wireless links 221 and 231, based on link scores generated by the link scoring system. As described herein (e.g., with respect to FIG. 1), the link scoring system and the dock-assisted DBS communication diversity system operating at the information handling system 200 or the docking station 270 in an embodiment may operate in tandem to determine a blended link score weighted based on sensitivity of currently executing software applications to one or more traffic metrics (e.g., latency). In another embodiment, weighted sub-scores for each of a plurality of traffic metrics (e.g., channel contention) known to impact performance of such software applications (e.g., by impacting latency), or normalized point values for each of the plurality of traffic metrics (e.g., channel contention) known to impact performance of such software applications (e.g., by impacting latency) may similarly be generated. It is contemplated any of these methods may be used to compare traffic metrics between two channels, so long as the same method is used to measure traffic at each channel the AP 280 is capable of using to transceive data with the information handling system 200 and with the docking station 270.

Following determination of such weighted blended link scores, weighted sub-scores, normalized scores, or other link scores according to other determinations, the dock-assisted DBS communication diversity system in an embodiment may identify two channels most likely to minimize latency. For example, the dock-assisted DBS communication diversity system may identify a first channel within one of the available frequency bands (e.g., 2.4 GHz, 5 GHz, 6 GHz, or 60 GHz) associated with a high blended link score weighted for latency-sensitive applications as optimal for establishment of wireless link 221, and a second channel within the same or another one of the available frequency bands associated with a next-highest blended link score weighted for latency-sensitive applications as optimal for establishment of wireless link 231. In such an example embodiment, the dock-assisted DBS communication diversity system may choose among wireless links based on blended link scores generated specifically for the purpose of analyzing latency.

In other embodiments, the blended link score may be generated to provide an overall estimation of connectivity, rather than a specific aspect of such connectivity (e.g., latency or throughput). In such embodiments, the dock-assisted DBS communication diversity system may identify optimal wireless links by referencing only portions of the blended link score pertinent to a specific traffic metrics (e.g., latency or throughput). In some embodiments, these portions of the blended link scores, or sub-scores may be weighted during generation of the blended link score. The dock-assisted DBS communication diversity system in such an embodiment may compare weighted sub-scores measuring a given traffic metric (e.g., latency or throughput) for two or more wireless links to identify a wireless link that will optimize performance of a software application sensitive to that given traffic metric. Any weighting of such a sub-score may be used in an embodiment, so long as the weighting applied to the given traffic metric (e.g., latency or throughput) applies consistently across all wireless links analyzed. For example, the dock-assisted DBS communication diversity system may identify a first channel within one of the available frequency bands (e.g., 2.4 GHz, 5 GHz, 6 GHz, or 60 GHz) associated with a high combination of link sub-scores for traffic metrics known to heavily influence latency (e.g., channel contention) as optimal for establishment of wireless link 221, and a second channel within the same or another one of the available frequency bands associated with a next-highest combination of link sub-scores for traffic metrics known to heavily influence latency as optimal for establishment of wireless link 231.

In still other embodiments, the dock-assisted DBS communication diversity system may compare raw or normalized sub-scores measuring a given traffic metric (e.g., latency or throughput) for two or more wireless links to identify a wireless link that will optimize performance of a software applications sensitive to that given traffic metric. For example, the dock-assisted DBS communication diversity system may identify a first channel within one of the available frequency bands (e.g., 2.4 GHz, 5 GHz, 6 GHz, or 60 GHz) associated with a high raw traffic metric (e.g., duration of time within allotted window the AP spends processing communications from other APs, docking stations, or information handling systems, used to describe channel contention) known to heavily influence latency as optimal for establishment of wireless link 221, and a second channel within the same or another one of the available frequency bands associated with a next-highest raw value for each of the plurality of traffic metrics known to heavily influence latency as optimal for establishment of wireless link 231. As yet another example, the dock-assisted DBS communication diversity system may identify a first channel within one of the available frequency bands (e.g., 2.4 GHz, 5 GHz, 6 GHz, or 60 GHz) associated with a high combination of normalized or raw values for each of the plurality of traffic metrics (e.g., channel contention above 80%) known to heavily influence latency as optimal for establishment of wireless link 221, and a second channel within the same or another one of the available frequency bands associated with a next-highest combination of normalized or raw values for each of the plurality of traffic metrics (e.g., channel contention above 70%) known to heavily influence latency as optimal for establishment of wireless link 231.

In various embodiments, the choice between the use by the dock-assisted DBS communication diversity system of weighted blended link scores, sub-scores, raw values, or normalized values to determine an optimal wireless link may depend upon the values output by the link scoring system and available to the dock-assisted DBS communication diversity system. In such a way, the dock-assisted DBS communication diversity system in an embodiment may automatically identify and establish a plurality of optimal wireless links selected to optimize performance of one or more latency-sensitive software applications currently executing on a DBS-enabled information handling system 200 in communication with a docking station 270 and an AP 280.

Figure 3:
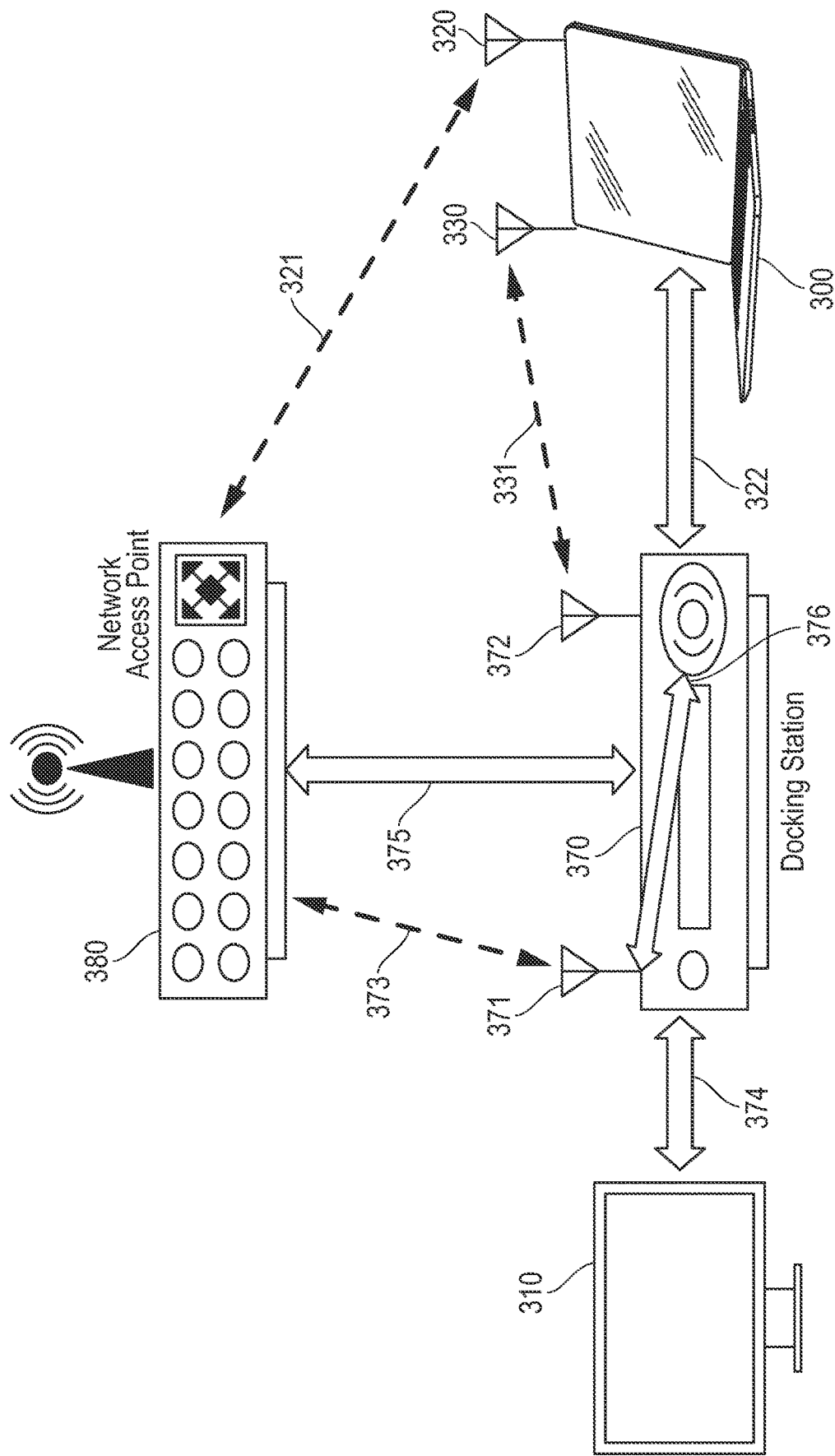
FIG. 3 is a block diagram illustrating an information handling system establishing an optimized configuration of wireless links via a plurality of antennas according to another embodiment of the present disclosure.

FIG. 3 is a block diagram illustrating a DBS-enabled information handling system establishing wireless links according to a configuration determined to optimize performance of currently executing software applications via a plurality of antennas according to a second embodiment of the present disclosure. As described herein, the wireless configuration determined by the dock-assisted DBS communication diversity system in embodiments to be optimal for the currently executing software applications may depend upon the particular needs of those software applications (e.g., higher throughput, lower latency), and upon the availability or score of a second antenna at the information handling system 300. FIG. 3 illustrates an optimal wireless link configuration for a DBS-enabled information handling system 300 capable of transceiving via a plurality of antennas (e.g., 320 and 330), and employing a peripheral display device 310, connected to the information handling system 300 via the docking station 370.

In an embodiment illustrated in FIG. 3, the docking station 370 may be in communication with an external display device 310 via a wired connection 374. The DBS-enabled information handling system 300 may communicate display instructions to the docking station 370 via a wired connection 322 or a wireless connection 331. The docking station 370 may forward these display instructions to the display device 310 via the wired connection 374, allowing the external display device 310 to operate as a display for execution of applications running at the DBS-enabled information handling system 300. In an embodiment in which the information handling system 300 transmits display instructions to the docking station 370 via a wireless connection, the dock-assisted DBS communication diversity system operating at the information handling system 300 may establish wireless link 331 between the information handling system 300 and the docking station 370 (in addition to the information handling system 300 and the AP 380, as described) in order to support the wireless communication of display instructions. The dock-assisted DBS communication diversity system in such an embodiment may also allow for transmission of other data set for delivery to the network via the AP 380 (e.g., in addition to display instructions) via wireless link 331. The docking station 370 in an embodiment may be capable of wireless communications with the AP 380 via a first docking station antenna 371 or a second docking station antenna 372. The docking station 370 may establish a docking station backhaul communication link with the network AP 380, or other APs via docking station antenna 371, while reserving docking station antenna 372 for transceiving of data with the information handling system 300. The docking station backhaul may include a wired connection 375 or a wireless connection 373, established via a first docking station antenna 371, in various embodiments.

When determining an optimal configuration, the dock-assisted DBS communication diversity system in an embodiment may consider end-to-end traffic conditions for configurations requiring more than one wired or wireless link between the information handling system 300 and the AP 380. For example, routing communications through the docking station 370 may include transceiving data through a wired link 376 internal to the docking station 370 between a port at which wired link 332 or wireless link 331 connects to the docking station 370 and a port connecting the docking station 370 to either wireless link 373 or wired link 375. Transceiving of data via this wired link 376 internal to the docking station 370 may be associated with added latency. Thus, the dock-assisted DBS communication diversity system in an embodiment may determine the combined latencies associated with either wired link 322 or wireless link 331, wired link 376, and either wireless link 373 or wired link 375 is greater than the latency associated with wireless link 321.

In another embodiment, such display information may not be transmitted from the information handling system 300 to the docking station 370 via a wireless link (e.g., the information handling system 300 is connected to the docking station 370 via a wired connection 322, or the information handling system 300 is not using the external display 310). In such an embodiment, the docking assisted DBS communication diversity system operating at the information handling system 300 may determine whether to use the second antenna 330 to establish a wireless link directly to the AP 380, or to establish a wireless link with the docking station 370 so as to enable indirect communication with the AP 380 via one or more of the antennas of the docking station 370, based on performance requirements or sensitivities of the applications currently executing at the information handling system 300. For example, in an embodiment, the information handling system 300 may be currently executing one or more software applications sensitive to throughput (e.g., data rate), or in which throughput may most meaningfully impact performance of the application. As described herein with reference to FIG. 1, the dock-assisted DBS communication diversity system in an embodiment may receive an indication of the sensitivities to currently executing applications at the information handling system 300 via a diagnostic analysis application. As also described herein with reference to FIG. 1, the dock-assisted DBS communication diversity system in an embodiment may receive link scores from a link scoring system describing traffic metrics for all channels upon which the AP 380 is capable of transceiving data. These link scores may describe traffic metrics for communications between the AP 380 and the information handling system 300, as well as communications between the AP 380 and the docking station 370.

The dock-assisted DBS communication diversity system in an embodiment may only assess establishing wireless links on channels associated with a blended link score (e.g., as generated by the link scoring system 180 described with reference to FIG. 1) meeting a preset threshold value. For example, in an embodiment described with reference to FIG. 1 in which the blended link score has a value between zero and 100, the dock-assisted DBS communication diversity system may only consider channels associated with blended link scores of 70 and higher for inclusion within the optimal wireless link configuration described herein. Other thresholds are contemplated in various embodiments, such as 30, 50, or 90, for example.

In an embodiment in which the dock-assisted DBS communication diversity system determines one or more currently executing software applications are sensitive to throughput, the dock-assisted DBS communication diversity system operating at the information handling system 300 may determine the optimal wireless link configuration includes one wireless link 321, established directly between the AP 380 and the information handling system 300 via the first antenna 320 and a second wireless link 331, established between the information handling system 300 and the docking station 370, via the second antenna 330. This may be the case since the wireless backhaul connection 373 or wired backhaul connection 375 established between the docking station 370 and the AP 380 has a higher throughput than all wireless links (e.g., 321) the information handling system 300 is capable of establishing directly with the AP 380. Thus, in order to take advantage of this greater throughput capacity, and because latency may not be as high a priority of a consideration, it may be optimal to route at least one wireless link (e.g., 331) through the docking station 370. In such a way, the dock-assisted DBS communication diversity system may identify a wireless or wired link configuration associated with the highest relative end-to-end throughput.

Higher throughput may be available via the docking station 370 by the second wireless link 331 when a display screen 310 is also utilized via the docking station 370. Thus, the second antenna 330 may be required to link through the docking station 370 via antenna 372 if there is no wired connection 322 for use of the additional display 310. In other embodiments, second wireless link 331 may be established through docking station 370 for high throughput on a second wireless link depending on the wireless link 373 between antenna 371 of the docking station 370 and AP 380 which may often be a better fidelity antenna system with better bandwidth in an example embodiment. Further, in some embodiments, there may be a wired link 375 between docking station 370 and AP 380 such that nearby wireless link 331 between antennas 330 and 372 may afford improved throughput even when the additional display 310 is not utilized via docking station 370 in some embodiments.

In an embodiment where latency sensitivity of operating software applications is critical and there is not a need to connect through docking station 370 for use of an external display 310 or there is also a wired connection 370 to docking station 322 but a wireless backhaul 373 to AP 380, the dock-assisted DBS communication diversity system determines may configure a DBS enable information handling system to directly link with AP 380. For example, the dock-assisted DBS communication diversity system determines to utilize antennas 320 and 330 to establish two direct wireless links as with 321 but not shown for antenna 330 in FIG. 3 with AP 380 due to low latency of such a direct wireless link for two high priority, latency-sensitive software applications operating on the information handling system 300. Such an example double wireless link from a DBS enable information handling system to a network access point is shown in the example embodiment of FIG. 2.

In an embodiment in which the dock-assisted DBS communication diversity system determines one or more currently executing software applications are sensitive to latency, and at least one of the wireless links (e.g., 331) must be routed to the docking station 370 (e.g., for wireless transmission of display instructions to the external display 310), the dock-assisted DBS communication diversity system operating at the information handling system 300 may determine the optimal wireless link configuration also includes a wireless link 321, established directly between the AP 380 and the information handling system 300 via the first antenna 320. This may be the case since less time is required to wirelessly transmit a packet from the information handling system 300 to the AP 380 than is required to wirelessly transmit a packet from the information handling system 300 to the docking station 370, then to the AP 380.

Upon dedicating the first antenna 320 to direct wireless communication with the AP 380, and dedicating the second antenna 330 to wireless communication with antenna 372 of the docking station 370 (such as for utilization of external display 310 when no wired link 322 is available), the dock-assisted DBS communication diversity system in an embodiment may also determine an optimal channel in which to transceive data via each of the wireless links 321 and 331, based on link scores generated by the link scoring system and determined sensitivities of software applications currently executing at the information handling system 300. As described herein (e.g., with respect to FIG. 1), the link scoring system and the dock-assisted DBS communication diversity system operating at the information handling system 300 or the docking station 370 in an embodiment may operate in tandem to determine a blended link score weighted based on sensitivity of currently executing software applications to one or more traffic metrics (e.g., throughput or latency). In another embodiment, weighted sub-scores for each of a plurality of traffic metrics (e.g., maximum data rate or channel contention) known to impact performance of such software applications (e.g., by impacting throughput or by impacting latency, respectively), or normalized point values for each of the plurality of traffic metrics (e.g., maximum data rate or channel contention) known to impact performance of such software applications (e.g., by impacting throughput or impacting latency, respectively) may similarly be generated. It is contemplated any of these methods may be used to compare traffic metrics between two channels, so long as the same method is used to measure traffic at each channel the AP 380 is capable of using to transceive data with the information handling system 300 and with the docking station 370.

Following determination of such weighted blended link scores, weighted sub-scores, or normalized scores, the dock-assisted DBS communication diversity system in an embodiment may identify channels most likely to optimize throughput or to minimize latency, depending on the sensitivities of software applications currently executing at the information handling system 300. For example, in an embodiment in which the information handling system 300 is executing at least one throughput-sensitive software application, the dock-assisted DBS communication diversity system may identify a channel of communication between the AP 380 and the docking station 370 within one of the available frequency bands (e.g., 2.4 GHz, 5 GHz, 6 GHz, or 60 GHz) associated with a high blended link score weighted for throughput-sensitive applications as optimal for establishment of wireless link 331. As another example, the dock-assisted DBS communication diversity system may identify a channel of communication between the AP 380 and the docking station 370 within one of the available frequency bands (e.g., 2.4 GHz, 5 GHz, 6 GHz, or 60 GHz) associated with a high combination of link sub-scores for traffic metrics determined to heavily influence throughput (e.g., maximum data rate) as optimal for establishment of wireless link 331. As yet another example, the dock-assisted DBS communication diversity system may identify a channel within one of the available frequency bands (e.g., 2.4 GHz, 5 GHz, 6 GHz, or 60 GHz) associated with a high combination of normalized point values for each of the plurality of traffic metrics (e.g., maximum data rate) known to heavily influence throughput as optimal for establishment of wireless link 331.

In another embodiment in which the dock-assisted DBS communication diversity system has dedicated the second antenna 330 to wireless communication with antenna 372 of the docking station 370 (e.g., for transmission of display information), the dock-assisted DBS communication diversity system may determine the information handling system 300 is not currently executing a throughput-sensitive application, or that the performance of at least two latency-sensitive software applications takes precedence over any throughput-sensitive software applications currently executing at the information handling system 300. In such an example embodiment, the dock-assisted DBS communication diversity system may identify a channel of communication between the AP 380 and the docking station 370 within one of the available frequency bands (e.g., 2.4 GHz, 5 GHz, 6 GHz, or 60 GHz) associated with a high blended link score weighted for latency-sensitive applications as optimal for establishment of wireless link 331. As another example, the dock-assisted DBS communication diversity system may identify a channel of communication between the AP 380 and the docking station 370 within one of the available frequency bands (e.g., 2.4 GHz, 5 GHz, 6 GHz, or 60 GHz) associated with a high combination of link sub-scores for traffic metrics known to heavily influence latency (e.g., channel contention) as optimal for establishment of wireless link 331. As yet another example, the dock-assisted DBS communication diversity system may identify a channel within one of the available frequency bands (e.g., 2.4 GHz, 5 GHz, 6 GHz, or 60 GHz) associated with a high combination of normalized point values for each of the plurality of traffic metrics (e.g., channel contention) known to heavily influence latency as optimal for establishment of wireless link 331.

The dock-assisted DBS communication diversity system in an embodiment in which the second antenna 330 has been dedicated to wireless communication with antenna 372 of the docking station 370 (e.g., for transmission of display information or based on current execution of at least one throughput-sensitive software application) may determine an optimal channel for wireless link 321 in an embodiment based on the performance sensitivities of other applications executing at the information handling system 300. For example, the information handling system 300 in an embodiment may be currently executing two throughput-sensitive software applications resulting in a need to optimize both wireless links 321 and 331 for transceiving of data in manner that maximizes throughput on both wireless links 321 and 331. As another example, the information handling system 300 in an embodiment may be currently executing two latency-sensitive software applications resulting in a need to optimize both wireless links 321 and 331 for transceiving of data in manner that minimizes latency on both wireless links 321 and 331. In yet another example, the information handling system 300 in an embodiment may be currently executing one throughput-sensitive software application and one latency-sensitive software application or other mix of applications, resulting in a need to optimize both wireless links 321 and 331 for transceiving of data in manner that maximizes throughput on wireless link 331 and minimizes latency on wireless link 321. The dock-assisted DBS communication diversity system in such an embodiment may dedicate the wireless link 331 routed through the docking station 370 to take advantage of the greater throughput in the backhaul between the AP 380 and the docking station 370 to any throughput-sensitive applications, and dedicate the wireless link 321 established directly between the AP 380 (e.g., excluding an intermediary connection with the docking station 370) and the information handling system 300 to any latency-sensitive applications.

In an embodiment in which the information handling system 300 is currently executing at least one latency-sensitive application, the dock-assisted DBS communication diversity system may identify a channel of communications between the information handling system 300 and the AP 380 within the same or another one of the available frequency bands at which wireless link 331 is transceiving that is associated with a high blended link score weighted for latency-sensitive applications as optimal for establishment of wireless link 321. In another example of such an embodiment, the dock-assisted DBS communication diversity system may identify a channel of communications between the information handling system 300 and the AP 380 within the same or another one of the available frequency bands at which wireless link 331 is transceiving that is associated with a high combination of link sub-scores for traffic metrics known to heavily influence latency as optimal for establishment of wireless link 321. In yet another example of such an embodiment, the dock-assisted DBS communication diversity system may identify a channel of communications between the information handling system 300 and the AP 380 within the same or another one of the available frequency bands at which wireless link 331 is transceiving that is associated with a high combination of normalized point values for each of the plurality of traffic metrics (e.g., channel contention) known to heavily influence latency as optimal for establishment of wireless link 321. The dock-assisted DBS communication diversity system in such an embodiment may then dedicate wireless link 331 to communication of data pursuant to execution of the throughput-sensitive software application at the information handling system 300 and dedicate wireless link 321 to communication of data pursuant to execution of the latency-sensitive software application at the information handling system 300.

In an embodiment in which the information handling system 300 is currently executing at least two throughput-sensitive applications, the dock-assisted DBS communication diversity system may identify a channel of communications between the information handling system 300 and the AP 380 within the same or another one of the available frequency bands at which wireless link 331 is transceiving that is associated with a high blended link score weighted for throughput-sensitive applications as optimal for establishment of wireless link 331. In another example, the dock-assisted DBS communication diversity system may identify a channel of communications between the information handling system 300 and the AP 380 within the same or another one of the available frequency bands at which wireless link 331 is transceiving that is associated with a high combination of link sub-scores for traffic metrics known to heavily influence throughput as optimal for establishment of wireless link 331. In yet another example, the dock-assisted DBS communication diversity system may identify a channel of communications between the information handling system 300 and the AP 380 within the same or another one of the available frequency bands at which wireless link 331 is transceiving that is associated with a high combination of normalized point values for each of the plurality of traffic metrics (e.g., maximum data rate) known to heavily influence throughput as optimal for establishment of wireless link 331.

Depending on the ability of the AP 380 to perform link aggregation, the dock-assisted DBS communication diversity system in an embodiment in which the information handling system 300 is currently executing at least two throughput-sensitive applications may further employ a load-balancing technique. If the AP 380 supports link aggregation, it may be capable of receiving a first portion of an IP payload via wireless link 321, receiving a second portion of the same IP payload via wireless link 331, then repackaging both of these portions into a whole IP payload within a single data frame, for transmission to the network. One benefit of such a capability is that the information handling system 300 may balance the traffic of data transceived across both wireless links 321 and 331, and decrease the risk of congestion at any one of the wireless links 321 or 331. Upon determining the AP 380 supports link aggregation in an embodiment in which the information handling system 300 is determined to currently be executing two throughput-sensitive software applications, the dock-assisted DBS communication diversity system may dedicate wireless links 321 and 331 to transceiving of data pursuant to execution of both of these throughput-sensitive software applications, using such a load balancing technique. In an embodiment in which the AP 380 does not support link aggregation, the dock-assisted DBS communication diversity system may dedicate wireless link 321 to communication of data pursuant to execution of a first throughput-sensitive software application at the information handling system 300, and dedicate wireless link 331 to communication of data pursuant to execution of a second throughput-sensitive software application at the information handling system 300. In such a way, the dock-assisted DBS communication diversity system in an embodiment may automatically identify and establish a plurality of optimal wireless links selected to optimize performance of software applications currently executing on a DB S-enabled information handling system 200 in communication with a docking station 270 and an AP 280, based on the sensitivities of these currently executing software applications, and upon the use of an external display 310.

Figure 4:
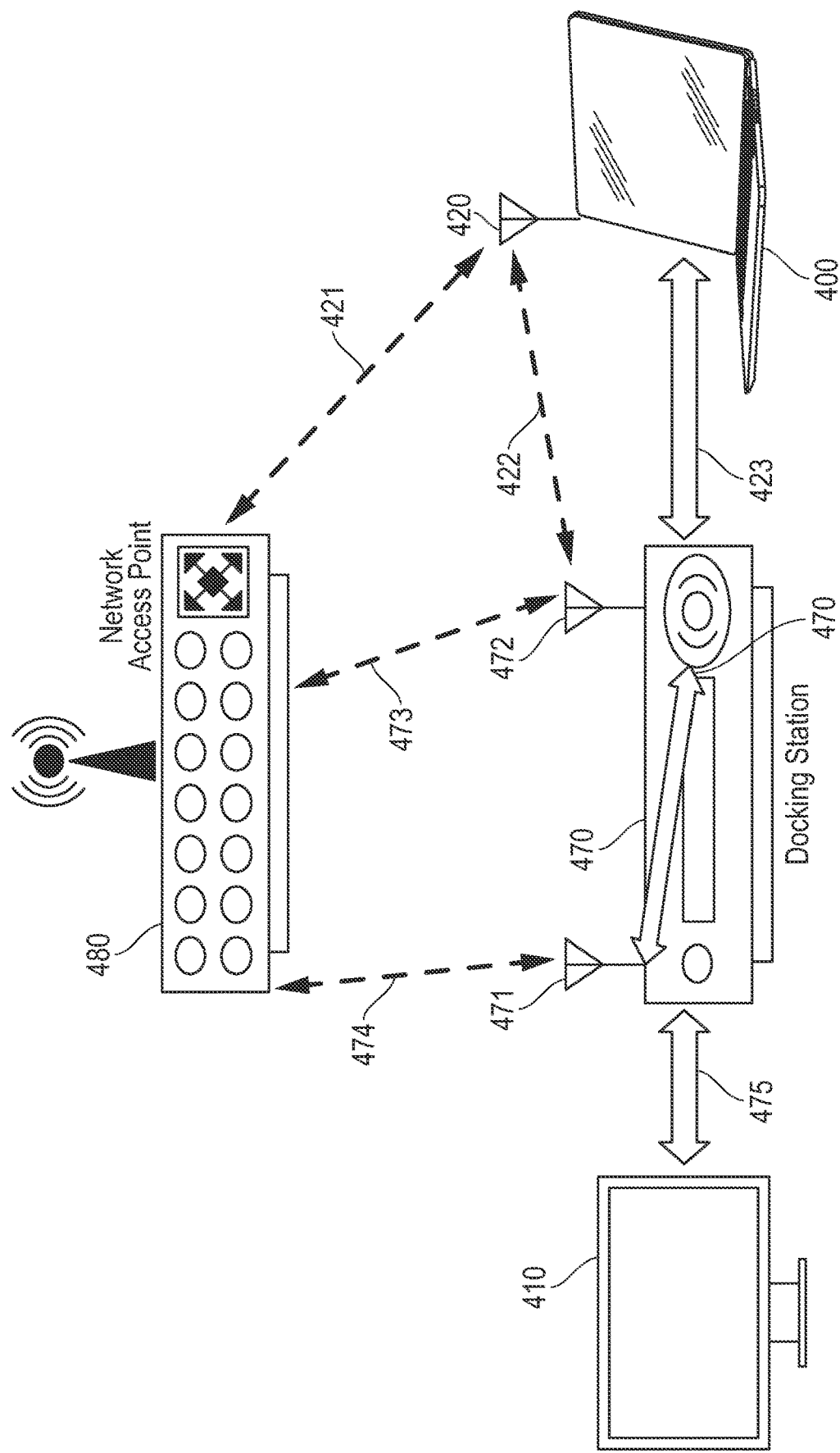
FIG. 4 is a block diagram illustrating an information handling system establishing an optimized wireless link according to an embodiment of the present disclosure.

FIG. 4 is a block diagram illustrating an information handling system establishing wireless links according to a configuration determined to optimize performance of currently executing software applications via an antenna of the information handling system or an antenna of a docking station according to an embodiment of the present disclosure. As described herein, the wireless configuration determined by the dock-assisted DBS communication diversity system in embodiments to be optimal for the currently executing software applications may depend upon the particular needs of those software applications (e.g., higher throughput, lower latency), and upon the availability of a second antenna at the information handling system 400. FIG. 4 illustrates a plurality of optimal wireless link configurations for an information handling system 400 not enabled for DBS communications, with each wireless link configuration described herein optimizing performance of one or more software applications sensitive to differing performance parameters (e.g., throughput, latency, dropped packets, etc.).

The dock-assisted DBS communication diversity system in an embodiment may execute at an information handling system 400 not enabled for DBS communications, which may be in communication with a wired or wireless docking station 470, or a network Access Point (AP) 480. The information handling system 400 may be in communication with the docking station 470 via at least one wired fronthaul link 423, which may be used, in part, to transceive display information directing operations of an external display 410 peripherally attached to the docking station 470 among other data via a wired connection 475. The information handling system 400 may also include a single antenna 420, capable of transceiving data wirelessly, either with the AP 480 via wireless link 421, or with the docking station 470 via wireless link 422. As described herein, the docking assisted DBS communication diversity system operating at the information handling system 400 in an embodiment may determine whether to use the antenna 420 to establish a wireless link directly to the AP 480, or to establish a wireless link with the docking station 470 so as to enable indirect communication with the AP 480 via one or more of the antennas of the docking station 470.

When determining an optimal configuration, the dock-assisted DBS communication diversity system in an embodiment may consider end-to-end traffic conditions for configurations requiring more than one wired or wireless link between the information handling system 400 and the AP 480. For example, routing communications through the docking station 470 may include transceiving data through a wired link 476 internal to the docking station 470 between a port at which wired link 423 or wireless link 422 connects to the docking station 470 and a port connecting the docking station 470 to wireless link 474 or 473. Transceiving of data via this wired link 476 internal to the docking station 470 may be associated with added latency. Thus, the dock-assisted DBS communication diversity system in an embodiment may determine the combined latencies associated with either wired link 423 or wireless link 422, wired link 476, and either wireless link 473 or 474 is greater than the latency associated with wireless link 231.

In an embodiment, the dock assisted DBS communication diversity system may determine whether to establish the wireless link 421 via the antenna 420 directly with the AP 480 or indirectly through wireless link 422 to the docking station 470, based on performance requirements or sensitivities of the applications currently executing at the information handling system 400. For example, in an embodiment, the information handling system 400 may be currently executing one or more software applications sensitive to latency, or in which latency may most meaningfully impact performance of the application. In the case where the information handling system 400 is executing two or more latency-sensitive applications, the dock-assisted DBS communication diversity system may transceive communications pursuant to execution of at least one of the latency-sensitive applications through the wired fronthaul 423, for transmission to the AP 480 via a wired or wireless backhaul connection between the docking station 470 and the AP 480. This wired fronthaul connection 423, if available, may thus transceive both data packets associated with at least one latency-sensitive software application and the display instructions required to direct operation of the external display 410. The dock-assisted DBS communication diversity system operating at the information handling system 400 may then determine a configuration of the wireless link (e.g., 421 or 422), established via 420, that may optimize performance of the at least one other latency-sensitive software application executing at the information handling system 400.

In an embodiment in which the information handling system 400 is currently executing at least one latency-sensitive software application, the dock-assisted DBS communication diversity system operating at the information handling system 400 may determine the optimal wireless link configuration includes wireless link 421, established directly between the AP 480 and the information handling system antenna 420. This may be the case when wireless communication through a direct wireless link between two points requires less time to complete than a wireless communication relayed between those two points by a third agent, thus resulting in lower latency. For example, less time is required to wirelessly transmit a packet from the information handling system 400 to the AP 480 than is required to wirelessly transmit a packet from the information handling system 400 to the docking station 470, then to the AP 480. The dock-assisted DBS communication diversity system in an embodiment may also dedicate wireless link 421 to transceiving of data pursuant to execution of the most latency-sensitive software application currently executing at the information handling system 400, in such an example embodiment.

Upon dedicating antenna 420 to direct wireless communication with the AP 480, the dock-assisted DBS communication diversity system in an embodiment may also determine an optimal channel in which to transceive data via wireless link 421, based on link scores generated by the link scoring system. Following determination of weighted blended link scores, weighted sub-scores, or normalized scores (e.g., as described with respect to FIG. 1), the dock-assisted DBS communication diversity system in various embodiments may identify a channel that is most likely to minimize latency. For example, the dock-assisted DBS communication diversity system may identify a channel within one of the available frequency bands (e.g., 2.4 GHz, 5 GHz, 6 GHz, or 60 GHz) associated with a high blended link score weighted for latency-sensitive applications as optimal for establishment of wireless link 421 in an embodiment. As another example embodiment, the dock-assisted DBS communication diversity system may identify a channel within one of the available frequency bands associated with a high combination of link sub-scores for traffic metrics known to heavily influence latency (e.g., channel contention) as optimal for establishment of wireless link 421. As yet another example embodiment, the dock-assisted DBS communication diversity system may identify a channel within one of the available frequency bands associated with a high combination of normalized point values for each of the plurality of traffic metrics (e.g., channel contention) known to heavily influence latency as optimal for establishment of wireless link 421. In such a way, the dock-assisted DBS communication diversity system in an embodiment may automatically identify and establish an optimal wireless link selected to optimize performance of one or more latency-sensitive software applications currently executing on an information handling system 400 not enabled for DBS communications but docked with docking station 470 by wire or wirelessly, in communication with an AP 480.

In an embodiment in which the information handling system 400 is connected to the docking station 470 via wired connection 473, the dock-assisted DBS communication diversity system may dedicate the wired connection 473 to the transceiving of data pursuant to execution of a second latency-sensitive software application. In yet another embodiment in which the information handling system 400 is connected to the docking station 470 via wired connection 473, and the docking station is transmitting display instructions to the external display 410 via wired connection 475, the dock-assisted DBS communication diversity system may dedicate the wired connection 473 to the transceiving of both the display information and the transceiving of data pursuant to execution of a second latency-sensitive software application. In an example embodiment in which the docking station 470 receives communication via wired link 423 pursuant to execution of a latency-sensitive software application, a dock-assisted DBS communication system operating, at least in part at the docking station 470 may determine an optimal channel and optimal antenna (e.g., 471 or 472) most likely to minimize latency on which to transceive data with the AP 480, based on weighted blended link scores, weighted sub-scores, or normalized scores (e.g., as described with respect to FIG. 1).

In another example embodiment, the information handling system 400 may be currently executing one or more software applications sensitive to throughput, or in which throughput may most meaningfully impact performance of the application. In the case where the information handling system 400 is executing two or more throughput-sensitive applications, the dock-assisted DBS communication diversity system may transceive communications pursuant to execution of at least one of the throughput-sensitive applications through the wired fronthaul 423, for transmission to the AP 480 via a wired or wireless backhaul connection between the docking station 470 and the AP 480. This wired fronthaul connection 423 may thus transceive both data packets associated with at least one throughput-sensitive software application and the display instructions required to direct operation of the external display 410. The dock-assisted DBS communication diversity system operating at the information handling system 400 may then determine a configuration of the wireless link (e.g., 421 or 422), established via 420, that may optimize performance of the at least one other throughput-sensitive software application executing at the information handling system 400.

In an embodiment where the information handling system 400 is executing at least one throughput-sensitive software application, the dock-assisted DBS communication diversity system operating at the information handling system 400 may determine the optimal wireless link configuration includes wireless link 422, established between the information handling system antenna 420 and the docking station 470. This may be the case since the wireless backhaul connection 473 or a wired backhaul connection established between the docking station 470 and the AP 480 has a higher throughput with wireless link 422 than all wireless links (e.g., 421) the information handling system 400 is capable of establishing directly with the AP 480. Thus, in order to take advantage of this greater throughput capacity, and because latency may not be consideration, it may be optimal to route the wireless link (e.g., 422) through the docking station 470. The dock-assisted DBS communication diversity system in an embodiment may also dedicate wireless link 422 to transceiving of data pursuant to execution of the most throughput-sensitive software application currently executing at the information handling system 400. In such a way, the dock-assisted DBS communication diversity system may identify a wireless or wired link configuration associated with the highest relative end-to-end throughput.

Upon dedicating antenna 420 to indirect wireless communication with the AP 480 through the docking station 470, the dock-assisted DBS communication diversity system in an embodiment may also determine an optimal channel in which to transceive data via wireless link 422, based on link scores generated by the link scoring system according to various embodiments. Following determination of weighted blended link scores, weighted sub-scores, or normalized scores (e.g., as described with respect to FIG. 1), the dock-assisted DBS communication diversity system in an embodiment may identify a channel that is most likely to maximize throughput. For example, in one embodiment, the dock-assisted DBS communication diversity system may identify a channel within one of the available frequency bands (e.g., 2.4 GHz, 5 GHz, 6 GHz, or 60 GHz) associated with a high blended link score weighted for throughput-sensitive applications as optimal for establishment of wireless link 422. As another example embodiment, the dock-assisted DBS communication diversity system may identify a channel within one of the available frequency bands associated with a high combination of link sub-scores for traffic metrics known to heavily influence throughput (e.g., maximum data rate) as optimal for establishment of wireless link 422. As yet another example embodiment, the dock-assisted DBS communication diversity system may identify a channel within one of the available frequency bands associated with a high combination of normalized point values for each of the plurality of traffic metrics (e.g., maximum data rate) known to heavily influence throughput as optimal for establishment of wireless link 422. In such a way, the dock-assisted DBS communication diversity system in an embodiment may automatically identify and establish an optimal wireless link selected to optimize performance of one or more throughput-sensitive software applications currently executing on an information handling system 400 not enabled for DBS communications, in communication with an AP 480.

In another example embodiment, the information handling system 400 may be currently executing one or more software applications sensitive to throughput, or in which throughput may most meaningfully impact performance of the application. In the case where the information handling system 400 is executing two or more throughput-sensitive applications, the dock-assisted DBS communication diversity system may transceive communications pursuant to execution of at least one of the throughput-sensitive applications through the wired fronthaul 423, for transmission to the AP 480 via a wired or wireless backhaul connection between the docking station 470 and the AP 480. This wired fronthaul connection 423 may thus transceive both data packets associated with at least one throughput-sensitive software application and the display instructions required to direct operation of the external display 410. The dock-assisted DBS communication diversity system operating at the information handling system 400 may then determine a configuration of the wireless link (e.g., 421 or 422), established via 420, that may optimize performance of the at least one other throughput-sensitive software application executing at the information handling system 400.

In yet another embodiment where the information handling system 400 is executing at least one throughput-sensitive software application and at least one latency-sensitive software application, the dock-assisted DBS communication diversity system operating at the information handling system 400 may determine that the optimal wireless link configuration includes establishing wireless link 421 directly with the AP 480 via antenna 420. In such an example embodiment, the optimal wireless configuration may include transceiving latency-sensitive application data through wireless link 421 and transceiving communications pursuant to execution of throughput-sensitive software applications through the wired fronthaul 423 to the docking station 470. Although the wired fronthaul 423 will also be used to transceive display information to the external display 410, the maximum data rate achievable via the combination of the fronthaul 423 and one of the backhaul connections (e.g., 473, 474, or a wired backhaul) between the AP 480 and the docking station 470 likely exceeds any achievable maximum data rate for wireless link 421. Thus, the dock-assisted DBS communication diversity system in such an embodiment may dedicate the wired fronthaul 423 to the transceiving of display data and data communicated pursuant to execution of the throughput-sensitive software application. Further, the dock-assisted DBS communication diversity system in such an embodiment may dedicate the wireless link 421 directly to the AP 480 to transceiving of data pursuant to execution of the latency-sensitive software application, since it involves the most direct route of communication.

In some embodiments, the docking station 470 may be capable of establishing two wireless links, via antennas 471 and 472. In such an embodiment, the docking station 470 may be capable of establishing a first docking station wireless backhaul connection 473 via antenna 472, and a second docking station wireless backhaul connection 474 via antenna 471. If the network AP 480 in such an embodiment supports link aggregation, the docking station 470 may employ a load-balancing technique to distribute data streams communicated pursuant to execution of throughput sensitive applications running at the information handling system 400 evenly across both wireless links 473 and 474 to provide further throughput or reduced latency with AP 480. In such a way, the dock-assisted DBS communication diversity system, executing at least in part at the docking station 470, may further optimize the wireless link configuration for execution of throughput-sensitive software applications at the information handling system 400.

Figure 5:
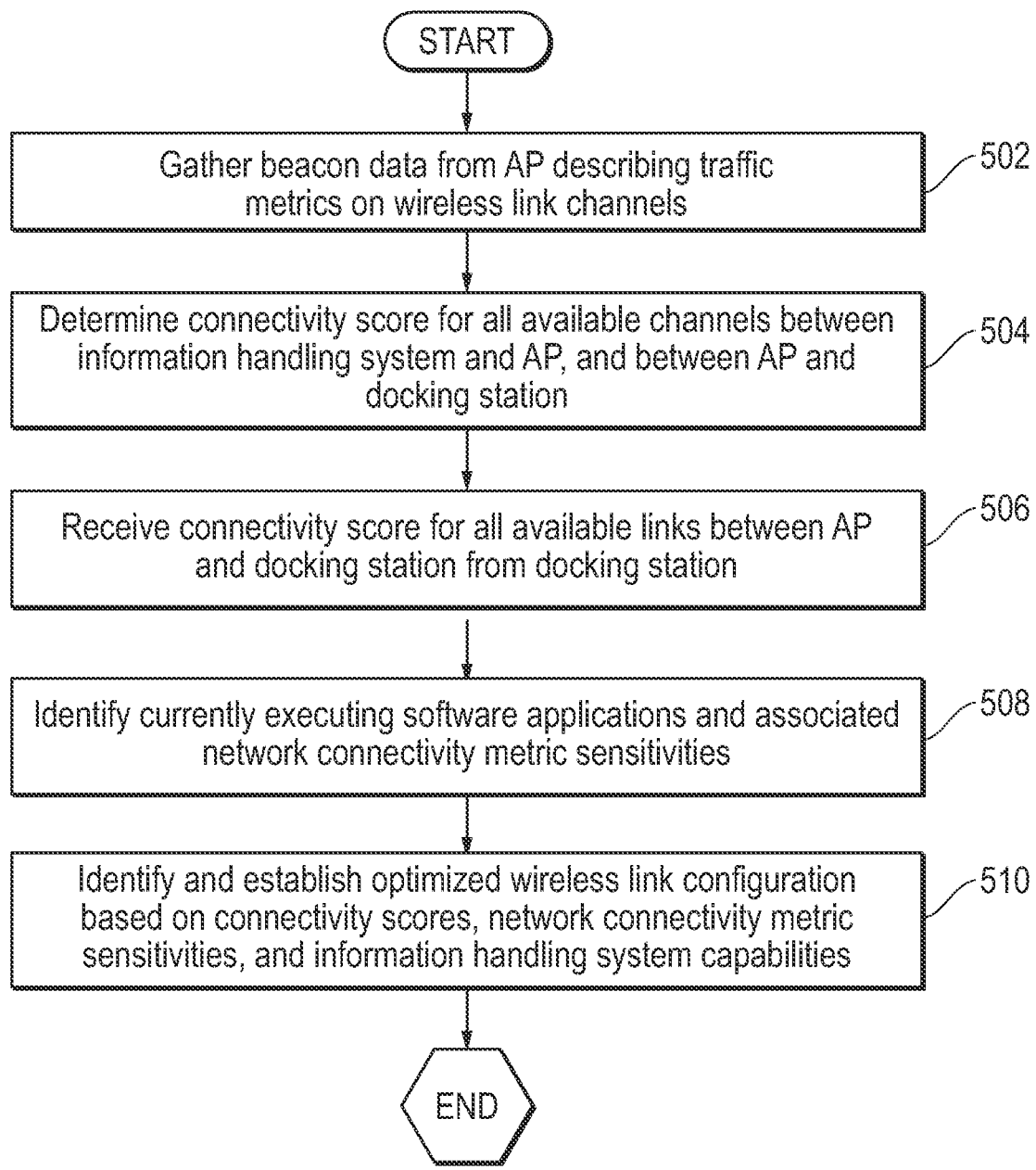
FIG. 5 is a flow diagram illustrating a method of gathering link scores and software application sensitivities to various wireless traffic metrics for determination of an optimized wireless link configuration according to an embodiment of the present disclosure.

FIG. 5 is a flow diagram illustrating a method of gathering link scores and information describing sensitivity of software applications currently executing at a mobile information handling system to various wireless traffic metrics for determination of an optimized wireless link configuration including available docking station interfacing according to an embodiment of the present disclosure. As described herein, the dock-assisted DBS communication diversity system in an embodiment may identify a configuration of wireless links that may be established between the information handling system (e.g., mobile computing device) and a network access point (AP) or a docking station in communication with the information handling system that optimizes performance of one or more software applications currently executing at the information handling system (e.g., mobile computing device). This determination may be made, in an embodiment, based on link scores describing traffic metrics on all available wireless link channels and upon sensitivities of software applications currently executing at the information handling system (e.g., mobile computing device) to specific traffic metrics gathered or determined according to the method of FIG. 5.

At block 502, an antenna adaptation controller operating at the information handling system or at the docking station in an embodiment may gather beacon data from a network AP describing traffic metrics on available wireless link channels. For example, in an embodiment described with reference to FIG. 1, the antenna adaptation controller 132 executing at the information handling system 100 (e.g., a mobile computing device or a docking station) may gather beacon data received from one or more nearby access points (APs) for the network 140 describing channels available for communication with that AP, as well as various current traffic metrics for communications on those channels. More specifically, such beacon information may provide a relative signal strength indicator (RSSI), identification of the network 140 as private or public, identification of the network 140 as compatible with multiple user, multiple input, multiple output (MU-MIMO) communications, high available data rate, channel contention, and current load of communications at the AP.

A link scoring system operating at the information handling system or a docking station in an embodiment may determine connectivity or link scores for each of the available channels between the information handling system and the AP and between the docking station and the AP at block 504. For example, a link scoring system 180 in an embodiment may generate such link scores to reflect or describe certain performance metrics for each of these wireless links, and to take into account network contention and network loading considerations. The link scoring system 180 (e.g., operating at the mobile computing device or at the docking system) may access beacon data gathered at block 502, and generate weighted and scaled scores for these beacon traffic metrics. Scores associated with some beacon data traffic metrics may be preset and applied on a binary basis. For example, a preset value may be assigned on a binary basis to a given channel based on identification of the network as private or public, identification of the network as MU-MIMO compliant, or whether multiple APs from which the information handling system 100 has received beacons are transceiving on the same channel. In some embodiments, the preset value assigned to each of these factors may be uniform across all information handling systems (e.g., 100), and may not take into account current operating needs for any specific information handling system (e.g., 100). The relative differences between these point values in an embodiment may indicate a weighted importance of each of these factors in overall communication performance. Other beacon-based traffic metrics may be associated with point values within a preset range of values, based on measured metrics stored in the beacon data. Again, the relative differences between the maximum achievable point values for each of these factors in an embodiment may indicate a weighted importance of each of these factors in overall communication performance.

In other embodiments, the preset point values attributable to each of these factors may be weighted differently, or the weight may vary based on the sensitivity to software applications (e.g., 170) currently executing at the processor 102 to one or more traffic metrics. For example, traffic factors or metrics affecting latency may be weighted more heavily upon a determination in an embodiment by the dock-assisted DBS communication system 160 that the software application 170 currently executing at the processor 102 is latency-sensitive. In another example, traffic factors or metrics affecting throughput may be weighted more heavily upon a determination in an embodiment by the dock-assisted DBS communication system 160 that the software application 170 currently executing at the processor 102 is throughput-sensitive.

In yet another embodiment, the link scoring system 180 may output a sub-score for each of these beacon-based traffic metrics in which the sub-scores are weighted uniformly, regardless of performance sensitivities of the applications executing at the information handling system, and the dock-assisted DBS communication diversity system 160 may adjust the weights of each of these sub-scores to generate an adjusted blended link score between zero and 100. In still another embodiment, the link scoring system 180 may transmit normalized but unweighted values for each of these beacon-based traffic metrics to the dock-assisted DBS communication diversity system 160. The dock-assisted DBS communication diversity system 160 in an embodiment may use any of these contemplated scores or values (e.g., weighted, non-weighted, or weighted based on sensitivities of currently executing software applications) to identify one or more wireless links having traffic metrics optimal for performance of currently executing software applications (e.g., 170).

At block 506, the dock-assisted DBS communication diversity system operating at the information handling system or the docking station may receive link scores determined by the link scoring system for all available links between the AP and the docking station from the docking station. For example, as described with reference to FIG. 1, the information handling system 100 may be a mobile computing device or a docking station. As such, the link scores determined at block 504 may be determined by a link scoring system operating at the docking station to gauge traffic on wireless links that may be established between the docking station and the AP. In such an embodiment, upon such a determination, the docking station may transmit the wireless link scores determined at block 504 at the docking station to the mobile computing device information handling system via a wired or wireless fronthaul connection. For example, as described with reference to FIG. 4, the docking station may be in communication with the information handling system 400 (e.g., mobile computing device) via a wireless link 422 or via a wired fronthaul connection 423.

A diagnostic analysis application executing at the information handling system in an embodiment may identify the software applications currently executing at the information handling system and associated sensitivities to various network traffic metrics at block 508. For example, in an embodiment described with reference to FIG. 1, a diagnostic analysis application 150 executing at the mobile computing system may gather performance metrics describing how each program consumes resources and identifies opportunities for optimization. More specifically, the diagnostic analysis application 150 may be capable of determining the volume of data transceived pursuant to execution of a given application (e.g., 170), or sensitivity of a given application (e.g., 170) to network latency.

At block 510, the dock-assisted DBS communication diversity system operating at the information handling system or the docking station may identify and establish wireless links according to the optimized wireless link configuration. As described in greater detail with respect to FIG. 6 below, the determination of the optimal wireless configuration may be made based on link scores gathered or determined at blocks 504 and 506, and sensitivities of currently executing software applications to various traffic metrics (e.g., throughput-sensitivity, or latency-sensitivity) determined at block 508. Such a determination may, in some embodiments, further depend upon information handling system capabilities such as a capability to transceive data via more than one antenna simultaneously (DBS communications), or upon use of an external display device. In such a way, the dock-assisted DBS communication system in an embodiment may determine and establish a configuration including one or more wireless links determined to optimize performance of one or more software applications currently executing at the information handling system. The method for gathering link scores and information describing sensitivity of software applications currently executing at a mobile computing device information handling system to various wireless traffic metrics for determination of an optimized wireless link configuration may then end.

Figure 6:
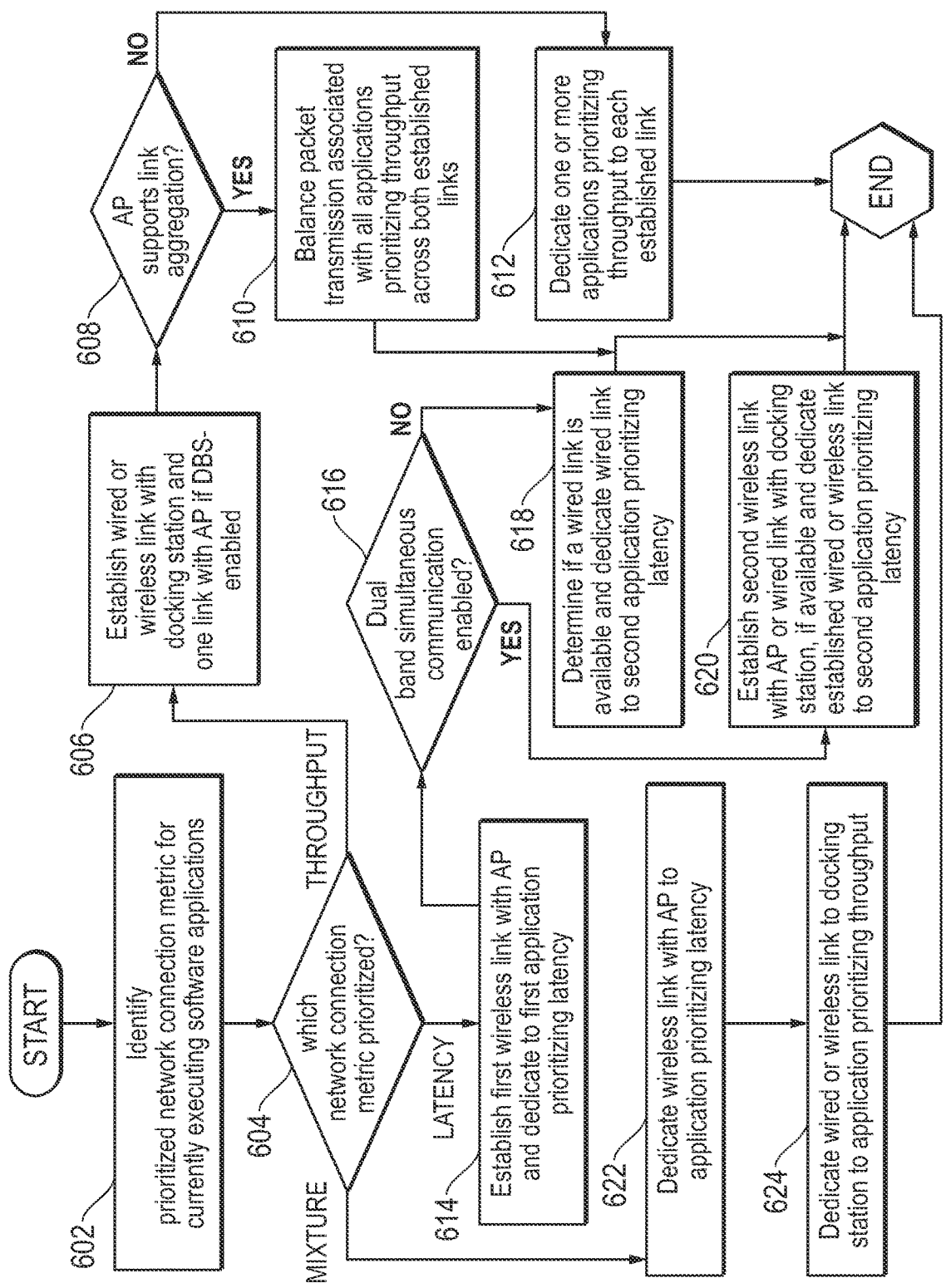
FIG. 6 is a flow diagram illustrating a method of identifying and establishing an optimized wireless link configuration according to an embodiment of the present disclosure.

FIG. 6 is a flow diagram illustrating a method of identifying and establishing an optimized wireless link configuration based on wireless link scores, sensitivities of currently executing software applications, and information handling system capabilities according to an embodiment of the present disclosure. As described herein, the dock-assisted DBS communication diversity system in an embodiment may optimize the routes by which various wireless links communicate data from an information handling system to a network AP when interfaced with a docking station, and may optimize the channel on which such wireless links operate so as to also optimize performance of one or more software applications currently executing at the information handling system.

At block 602, the dock-assisted DBS communication system in an embodiment may identify one or more prioritized traffic metrics for one or more software applications currently executing at the information handling system (e.g., mobile computing device). For example, in an embodiment described with reference to FIG. 1, the dock-assisted DBS communication diversity system 160 may perform tasks related to establishing a configuration of wireless links to the network 140 to optimize performance of one or more software applications (e.g., 170) currently executing at the processor 102. The dock-assisted DBS communication diversity system 160 in embodiments may gather performance requirements or performance metrics for one or more software applications (e.g., 170) executing at the information handling system 100 at any given time. For example, a diagnostic analysis application 150 executing at the mobile computing system may gather performance metrics describing how each program consumes resources and identifies opportunities for optimization. More specifically, the diagnostic analysis application 150 may be capable of determining the volume of data transceived pursuant to execution of a given application (e.g., 170), or sensitivity of a given application (e.g., 170) to network latency. For example, the diagnostic analysis application 150 may identify a database query software application, such as Microsoft® Access® that is transceiving large volumes of data (e.g., requests for remotely stored data and returns) as a throughput-sensitive software application in an embodiment. Other examples may include graphics intensive applications such as auto-cad software systems or down loading systems for content. As another example, the diagnostic analysis application 150 may identify a videoconferencing application such as Microsoft® Teams®, or Zoom® that operates best when playing back received videos of multiple users nearly simultaneously to the time of recording as a latency-sensitive software application in another embodiment. Similar examples may include virtual reality systems, gaming software, or similar software applications where latency is an important factor for usage.

The dock-assisted DBS communication diversity system in an embodiment may determine at block 604 which traffic metric is prioritized by the one or more software applications currently executing at the information handling system. For example, one or more software applications currently executing at the information handling system may be sensitive to throughput, such that variations in maximum data rate impact the performance of those software applications more greatly than other traffic metrics gathered and analyzed by the link scoring system (e.g., as described above at blocks 502, 504, and 506 of FIG. 5). In another example, one or more software applications currently executing at the information handling system may be sensitive to latency, such that variations in channel contention (or other variables affecting latency, as described herein) impact performance of those software applications more greatly than other traffic metrics.

In some embodiments, the information handling system may currently be executing a plurality of software applications, with each application sensitive to a different traffic metric. For example, the information handling system may be currently executing one latency-sensitive software application and one throughput-sensitive software application. If the currently executing software applications are throughput-sensitive, the method may proceed to block 606 to determine a wireless link configuration that will optimize performance of the throughput-sensitive software applications. If the currently executing software applications are latency-sensitive, the method may proceed to block 614 to determine a wireless link configuration that will optimize performance of the latency-sensitive software applications. If the currently executing software applications include at least one latency-sensitive application and at least one throughput-sensitive application, the method may proceed to block 622 to determine a wireless link configuration including at least one wireless or wired link that will optimize performance of the latency-sensitive software application and at least one wireless or wired link that will optimize performance of the throughput-sensitive software application.

At block 606, the dock-assisted DBS communication diversity system in an embodiment in which the information handling system is currently executing a throughput-sensitive software application(s) may determine an optimal wireless configuration including at least one wired or wireless link between the docking station and the information handling system. For example, in an embodiment described with respect to FIG. 4, the dock-assisted DBS communication diversity system may transceive communications pursuant to execution of at least one of the throughput-sensitive applications through the wired fronthaul 423, for transmission to the AP 480 via a wired or wireless backhaul connection between the docking station 470 and the AP 480. The dock-assisted DBS communication diversity system operating at the information handling system 400 in such an embodiment may determine the optimal wireless link configuration includes wireless link 422, established between the information handling system antenna 420 and the docking station 470, because the wireless backhaul connection 473 or wired backhaul connection established between the docking station 470 and the AP 480 has a higher throughput than all wireless links (e.g., 421) the information handling system 400 is capable of establishing directly with the AP 480. In such a way, the dock-assisted DBS communication diversity system may identify a wireless or wired link configuration associated with the highest relative end-to-end throughput. The dock-assisted DBS communication diversity system in an embodiment may also determine an optimal channel most likely to maximize throughput in which to transceive data via the wireless link 422, based on weighted blended link scores, weighted sub-scores, or normalized scores (e.g., as described with respect to FIG. 1).

The dock-assisted DBS communication diversity system in such an embodiment may also dedicate wireless link 421 to transceiving of data pursuant to execution of the most throughput-sensitive software application currently executing at the information handling system 400. For example, in an embodiment described with reference to FIG. 1, the SDN controller 116 in an embodiment may operate, in part, to route data transceived pursuant to execution of one or more software applications 170 currently executing at the processor 102 via a specifically identified wireless link such that the data is only transceived within a radio frequency sub-portion assigned to that software application 170 currently executing at the processor 102 by the dock assisted DBS communication diversity system 160. The SDN controller 116 in an embodiment may operate in a control plane layer (e.g., via software), in part, to route incoming packets/frames to a network interface device for transmission in a specific network slice, or on a specific channel. For example, the SDN controller 116 may operate to receive packets or frames generated pursuant to execution at the processor 102 of a specifically identified software application 170, and route those frames to the network interface device 140 for transmission within a preset or identified radio frequency sub-portion (e.g., network slice) assigned to the software application 170 currently executing at the processor 102. Similarly, the SDN controller 116 may retrieve packets or frames received at the network interface device 130 within the preset or identified radio frequency sub-portion (e.g., network slice or channel) assigned to the software application 170 currently executing a the processor 102 and transmit the data encapsulated within the received packet or frame to the software application 170 associated with that preset or identified radio frequency sub-portion by the dock assisted dual-band simultaneous communication diversity system 160. In such a way, the SDN controller 116 may cause data frames or packets generated or received pursuant to the current execution of the software application 170 at the processor 102 to be transceived via the network interface device 130 within a specific network slice or specifically identified radio frequency sub-portion (e.g., channel suitable for a throughput-sensitive software application).

The optimal wireless configuration determined at block 606 further may determine if the information handling system is DBS-enabled in an embodiment. An optimal wireless configuration in such an embodiment may also include a wireless link directly between the AP and the information handling system, if the information handling system is DBS-enabled. For example, in an embodiment described with reference to FIG. 3, in which the dock-assisted DBS communication diversity system determines one or more software applications currently executing at the information handling system 300 are sensitive to throughput, the dock-assisted DBS communication diversity system may determine the optimal wireless link configuration includes one wireless link 321, established directly between the AP 380 and the information handling system 300 via the first antenna 320 and a second wireless link 331, established between the information handling system 300 and the docking station 370, via the second antenna 330.

The dock-assisted DBS communication diversity system in an embodiment may determine at block 608 whether the AP supports link aggregation. Depending on the ability of the AP to perform link aggregation, the dock-assisted DBS communication diversity system in an embodiment in which the information handling system is currently executing at least two throughput-sensitive applications may further employ a load-balancing technique. For example, in an embodiment described with reference to FIG. 3, if the AP 380 supports link aggregation, it may be capable of receiving a first portion of an IP payload via wireless link 321, receiving a second portion of the same IP payload via wireless link 331, then repackaging both of these portions into a whole IP payload within a single data frame, for transmission to the network. One benefit of such a capability is that the information handling system 300 may balance the traffic of data transceived across both wireless links 321 and 331, and decrease the risk of congestion at any one of the wireless links 321 or 331 and provide greater throughput capacity. An identification of the AP as supporting link aggregation or not supporting link aggregation may be included within the beacon data received at block 502 in FIG. 5 in an embodiment.

At block 610, in an embodiment in which the AP supports link aggregation, the dock-assisted DBS communication diversity system may balance packet transmission associated with execution of a plurality of throughput-sensitive software applications across both established links. For example, upon determining the AP 380 supports link aggregation in an embodiment in which the information handling system 300 is determined to currently be executing two throughput-sensitive software applications, the dock-assisted DBS communication diversity system may dedicate wireless links 321 and 331 to transceiving of data pursuant to execution of both of these throughput-sensitive software applications, using a load balancing technique. The method for establishing wireless links according to a configuration for optimizing performance of throughput-sensitive software applications may then end.

The dock-assisted DBS communication diversity system in an embodiment in which the AP does not support link aggregation may dedicate each established wireless link to transceiving of data pursuant to execution of one of the plurality of throughput-sensitive applications. For example, the dock-assisted DBS communication diversity system may dedicate wireless link 321 to communication of data pursuant to execution of a first throughput-sensitive software application at the information handling system 300, and dedicate wireless link 331 to communication of data pursuant to execution of a second throughput-sensitive software application at the information handling system 300. In such a way, the dock-assisted DBS communication diversity system in another embodiment may automatically identify and establish a plurality of optimal wireless links selected to optimize performance of plural software applications currently executing on a DBS-enabled information handling system 200 in communication with a docking station 270 and an AP 280, based on the sensitivities of these currently executing software applications, and upon the use of an external display 310. The method for establishing wireless links according to a configuration for optimizing performance of throughput-sensitive software applications may then end.

Returning to block 604, in an embodiment in which it is determined the information handling system is currently executing a plurality of latency-sensitive software applications, the dock-assisted DBS communication diversity system may establish at least one wireless link directly with the AP at block 614. For example, in an embodiment described with respect to FIG. 4 in which the information handling system 400 is currently executing at least one latency-sensitive software application, the dock-assisted DBS communication diversity system operating at the information handling system 400 may determine the optimal wireless link configuration includes wireless link 421, established directly between the AP 480 and the information handling system antenna 420. This may be the case since wireless communication through a direct wireless link between two points requires less time to complete than a wireless communication relayed between those two points by a third agent, thus resulting in lower latency. For example, less time is required to wirelessly transmit a packet from the information handling system 400 to the AP 480 than is required to wirelessly transmit a packet from the information handling system 400 to the docking station 470, then to the AP 480. In such a way, the dock-assisted DBS communication diversity system may identify a wireless or wired link configuration associated with the lowest relative end-to-end latency. The dock-assisted DBS communication diversity system in an embodiment may also determine an optimal channel with minimal latency in which to transceive data via the wireless link established at block 614, based on weighted blended link scores, weighted sub-scores, or normalized scores, or other link scoring (e.g., as described with respect to FIG. 1).

At block 616, the dock-assisted DBS communication diversity system may determine whether the information handling system is enabled for DBS communication. As described herein, DBS-enabled mobile computing devices may include two or more antennas, with each antenna transceiving on a separate channel or frequency band. Analogous to adding a second lane to a road, adding a second wireless link for communication between the mobile computing device and the AP via such a second antenna may decrease traffic on any single wireless link between the AP and the mobile computing device by distributing the data being transceived across both wireless links. This may consequently increase the speed and quality (e.g., fewer dropped packets) at which this data is transceived. If the information handling system is not DBS-enabled, the method may proceed to block 618 for establishment of a wired link between the information handling system and the docking station, if one is available, to optimize performance of the latency-sensitive software applications currently executing at the information handling system. If the information handling system is DBS-enabled, the method may proceed to block 620 for configuration of a wireless link via the second antenna to optimize performance of the latency-sensitive software applications currently executing at the information handling system.

At block 618, in an embodiment in which the information handling system does not support DBS communications and only transceives via a single antenna, there is not a second antenna or second wireless link available for dedication to execution of a second latency-sensitive application. In such an example embodiment, the dock-assisted DBS communication diversity system may determine if a wired link is available with the docking station. If so, the dock-assisted DBS communication diversity system may then dedicate a wired link between the information handling system and the docking system, rather than a second wireless link, to transceiving of data pursuant to execution of a second latency-sensitive software application at the information handling system. When a wired link is available, as described above with respect to block 614, the single antenna of the information handling system in such an embodiment may be in use to establish a wireless link directly with the AP. This wireless link to the AP may be dedicated to transceiving of data pursuant to execution of a first latency-sensitive software application at the information handling system. Thus, the dock-assisted DBS communication system in such an embodiment at block 618 may leverage the wired connection between the docking station and the information handling system, if one is established, to transceive data pursuant to a second latency-sensitive software application.

For example, in an embodiment described with reference to FIG. 4 in which it is detected that the information handling system 400 is connected to the docking station 470 via wired connection 473, the dock-assisted DBS communication diversity system may dedicate the wired connection 473 to the transceiving of data pursuant to execution of a second latency-sensitive software application. In yet another embodiment in which the information handling system 400 is connected to the docking station 470 via wired connection 473, and the docking station is transmitting display instructions to the external display 410 via wired connection 475, the dock-assisted DBS communication diversity system may dedicate the wired connection 473 to the transceiving of both the display information and the transceiving of data pursuant to execution of a second latency-sensitive software application. In an example embodiment in which the docking station 470 receives communication via wired link 423 pursuant to execution of a latency-sensitive software application, a dock-assisted DBS communication system operating, at least in part at the docking station 470 may determine an optimal channel and optimal antenna (e.g., 471 or 472) most likely to minimize latency on which to transceive data wirelessly between the docking station and the AP 480, based on weighted blended link scores, weighted sub-scores, or normalized scores (e.g., as described with respect to FIG. 1). The method for establishing wireless links according to a configuration for optimizing performance of latency-sensitive software applications may then end.

The dock-assisted DBS communication diversity system in an embodiment in which the information handling system is detected to be a DBS-enabled information handling system at block 616 and is currently executing latency-sensitive software applications may establish a second link. This second wireless link may be dedicated to execution of a second latency-sensitive application at block 620. The dock-assisted DBS communication diversity system in an embodiment may determine whether a wired link between the docking station and the information handling system is available. In a further embodiment, the dock-assisted DBS communication diversity system may determine whether display data is being routed through the docking station to an external display requiring connection through docking station. For example, in an embodiment described with reference to FIG. 3, a wired link 322 may be established between information handling system 300 and the docking station 370. In another aspect, a wireless link 331 may be established with docking station 370.

In an embodiment in which such a wired link (e.g., 322) is available, the dock-assisted DBS communication diversity system may determine whether direct wireless communication between the information handling system and the AP involves more or less latency than indirect communication through the docking station. For example, the dock-assisted DBS communication diversity system may determine latency of communications directly between the AP 380 and the information handling system 300 (e.g., via wireless link 321). This direct wireless communication latency measurement may then be compared to the combined latency of the wired link (e.g., 322) between the docking station 370 and the information handling system 300 and the wired (e.g., 375) or wireless (e.g., 373) link between the docking station 370 and the AP 380. Wireless links typically are associated with greater latency than wired links however multiple links or hops may be associated with greater latency than a single hop wireless link. Thus, it is possible the combined latency of the wired link 322 and the wired backhaul link 375 is lower than the latency for the wireless link 321. In such an embodiment, the dock-assisted DBS communication diversity system may determine the optimal wireless link configuration includes the direct wireless link 321 dedicated to the first latency-sensitive application (e.g., at block 614), and wired links 322 and 375 dedicated to the second latency-sensitive application where such an arrangement is available. In other embodiments, a second direct wireless link from antenna 330 to AP 380 may have lower latency than wired links 322 and 375, a combination of a wired link 322 and wireless link 373, a combination of wireless link 331 and wired link 375, or a combination of wireless links 331 and 373 with AP 380. In such a situation, two wireless links from antennas 320 and 330 to AP 380 may be established. This may depend, however, upon no display data needing to be provided to display 312 through docking station 370 when no wired link 322 is available in some embodiments as described below.

Routing communications through the docking station in an embodiment may result in higher latency than direct communication between the AP and the information handling system in an embodiment in which communications through the docking station requires at least one wireless link. For example, the dock-assisted DBS communication diversity system in an embodiment described with reference to FIG. 2 may determine the docking station 270 is connected to the AP 280 via wireless link 273, and no wired backhaul (e.g., 275) is available. As another example, the dock-assisted DBS communication diversity system in an embodiment described with reference to FIG. 3 may determine the docking station 370 is capable of connecting to the information handling system 300 via wireless link 331, and no wired fronthaul (e.g., 322) is available. In some embodiments, the dock-assisted DBS communication diversity system may automatically determine that a wireless link established between information handling system and the AP is more likely to minimize latency than a link configuration that includes a wireless link between the docking station and either the AP or the information handling system. In such embodiments, the dock-assisted DBS communication diversity system may automatically establish and dedicate a second wireless link directly between the AP and the information handling system to execution of the second latency-sensitive application.

In another embodiment, the dock-assisted DBS communication diversity system may compare latency of direct communication between the AP and the information handling system (e.g., via wireless link 231 in FIG. 2) to the combined latency of communication, including at least one wireless link, routed through the docking station (e.g., via a combination of wireless links 331 and 373, a combination of wireless link 331 and wired backhaul 375, or a combination of wired fronthaul 322 and wireless link 373). Based on this comparison, the dock-assisted DBS communication diversity system in such an embodiment may establish one or more wireless links associated with a lowest latency (or combined latency in the case of combined wired/wireless links), and dedicate those one or more wireless links to the execution of the second latency-sensitive application.

In still another embodiment, the dock-assisted DBS communication diversity system may determine the optimal wireless link configuration based, at least in part, upon use of a peripheral display device operatively coupled to the docking station. For example, in an embodiment described with reference to FIG. 3, the dock-assisted DBS communication diversity system may determine the information handling system 300 does not share a wired connection with the docking station 370, and that the information handling system 300 is routing display instructions to the peripheral display 310 via the docking station 370. Transceiving of such display instructions through the docking station 370 requires at least one connection between the information handling system 300 and the docking station 370. In the absence of an available wired connection (e.g., 322), such display instructions may be transceived on a wireless link 331 between the information handling system 300 and the docking station 370. In such an embodiment, the dock-assisted DBS communication diversity system may determine the optimal wireless link configuration includes the wireless link 331 between the information handling system 300 and the docking station 370, and may assign all communications made pursuant to execution of the second latency-sensitive software application to wireless link 331.

In other embodiments, in which the dock-assisted DBS communication diversity system determines the optimal wireless link configuration for optimizing performance of latency-sensitive software applications at a DBS-enabled information handling system includes two wireless links established directly between the information handling system and the AP (so as to avoid transmission through a third agent such as the docking station, for example), the dock-assisted DBS communication diversity system in an embodiment may also determine an optimal channel in which to transceive data. Such a determination with respect to wireless links 221 and 231 in an embodiment may be made based on link scores generated by the link scoring system. The dock-assisted DBS communication diversity system in an embodiment may identify two channels most likely to minimize latency based on weighted blended link scores, weighted sub-scores, or normalized scores or other link scoring generated by the link scoring system, for example. In such a way, the dock-assisted DBS communication diversity system in an embodiment may automatically identify and establish a plurality of optimal wireless links selected to optimize performance of one or more latency-sensitive software applications currently executing on a DBS-enabled information handling system 200 in communication with a docking station 270 and an AP 280.

The dock-assisted DBS communication diversity system may also dedicate the second wireless link to transceiving of data pursuant to execution of one of the latency-sensitive software applications. For example, in an embodiment described with reference to FIG. 1, the SDN controller 116 in an embodiment may operate, in part, to route data transceived pursuant to execution of one or more software applications 170 currently executing at the processor 102 via a specifically identified wireless link such that the data is only transceived within a radio frequency sub-portion assigned to that software application 170 currently executing at the processor 102 by the dock assisted DBS communication diversity system 160. In such a way, the SDN controller 116 may cause data frames or packets generated or received pursuant to the current execution of the software application 170 at the processor 102 to be transceived via the network interface device 130 within a specific network slice or specifically identified radio frequency sub-portion (e.g., channel). The method for establishing wireless links according to a configuration for optimizing performance of throughput-sensitive software applications may then end.

In an embodiment in which the information handling system is determined to be currently executing at least one throughput-sensitive software application and at least one latency-sensitive software application, the dock-assisted DBS communication diversity system may establish one wireless link directly between the AP and the information handling system at block 622 for the latency-sensitive software application. For example, in an embodiment described with reference to FIG. 3, in which the information handling system 300 is currently executing one throughput-sensitive software application and one latency-sensitive software application, the dock-assisted DBS communication diversity system operating at the information handling system 300 may determine the optimal wireless link configuration includes a wireless link 321, established directly between the AP 380 and the information handling system 300 via the first antenna 320 having a wireless link score indicating acceptable latency levels are minimized. This may be the case since less time is required to wirelessly transmit a packet from the information handling system 300 to the AP 380 than is required to wirelessly transmit a packet from the information handling system 300 to the docking station 370, then to the AP 380.

The dock-assisted DBS communication diversity system in an embodiment may also determine an optimal channel among channels on a direct wireless link between the information handling system and the AP most likely to minimize latency in which to transceive data via the wireless link 321, based on weighted blended link scores, weighted sub-scores, or normalized scores (e.g., as described with respect to FIG. 1). The dock-assisted DBS communication diversity system may then dedicate the wireless link 321 established directly between the AP 380 (e.g., excluding an intermediary connection with the docking station 370) and the information handling system 300 to transceiving of data pursuant to execution of any latency-sensitive applications at information handling system 300.

At block 624, the dock-assisted DBS communication diversity system may establish a wired or wireless link between the docking station and the information handling system for transceiving of data pursuant to execution of a throughput-sensitive software application. For example, the dock-assisted DBS communication diversity system operating at the information handling system 300 may determine the optimal wireless link configuration includes wireless link 331, established between the information handling system 300 and the docking station 370, via the second antenna 330 (or a wired link 322 if one is available). This may be the case since the wireless backhaul connection 373 or a wired backhaul connection 375 established between the docking station 370 and the AP 380 has a higher throughput in combination with wireless link 331 to the information handling system 300 (or wired link 322) than all wireless links (e.g., 321) the information handling system 300 is capable of establishing directly with the AP 380.

The dock-assisted DBS communication diversity system in an embodiment may also determine an optimal channel most likely to maximize throughput in which to transceive data via the wireless link 331 (if no wired link 322) as well as any other wireless backhaul link 373, based on weighted blended link scores, weighted sub-scores, normalized scores, raw scores, or any other link scoring (e.g., as described with respect to FIG. 1). The dock-assisted DBS communication diversity system in an embodiment may dedicate the wireless link 331 (or wired link 322) routed through the docking station 370 any wireless backhaul 373 or wired backhaul 375 to any throughput-sensitive applications to take advantage of the greater throughput via the backhaul between the AP 380 and the docking station 370. The method for establishing wireless links according to a configuration for optimizing performance of at least one latency-sensitive software application and at least one throughput-sensitive software application may then end.

The blocks of the flow diagrams of FIGS. 5-6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system operating a dock assisted dual-band simultaneous (DBS) communication diversity system comprising:

a processor, executing code instructions of a diagnostic analysis application, to identify one or more latency-sensitive software applications currently executing at the processor and determining a prioritization of executing software applications based to prioritize the one or more latency-sensitive software applications over other executing software applications for minimized latency in communications for optimal performance of those one or more latency-sensitive software applications;

the processor, executing code instructions of the dock assisted DBS communication diversity system, to identify an optimized wireless link configuration dedicating a lower latency wireless link among a plurality of links between the information handling system and a network access point (AP) and a plurality of wireless links between the information handling system and a docking station with minimized latency for electronic communications transceived pursuant to execution of the one or more latency-sensitive software applications; and a network interface device transceiving data via a plurality of wireless links with the AP and the docking station according to an optimized wireless link configuration, wherein the lower latency wireless link is used for the one or more latency-sensitive software applications to decrease a number of wireless hops required to transceive packets from the information handling system to the AP and correspondingly decrease latency for the one or more latency-sensitive software applications.

2. The information handling system of claim 1 further comprising:

the network interface device to support DBS communication, wherein the optimized wireless link configuration includes a plurality of wireless links between the information handling system and the AP.

3. The information handling system of claim 1 further comprising:

the network interface device to support DBS communication, wherein the optimized wireless link configuration includes one wireless link between the information handling system and the AP and a wired link between the information handling system and the docking station transceiving image display data.

4. The information handling system of claim 1 further comprising:

the network interface device being incompatible with DBS communication, wherein the optimized wireless link configuration includes one wireless link between the information handling system and the AP and one wired link between the information handling system and the docking station.

5. The information handling system of claim 1 further comprising:

the processor, executing code instructions of a link scoring system, to determine a test backhaul connectivity score describing network connectivity performance metrics for one or more test backhaul wireless links between the information handling system and the AP meets a threshold percentage value of 70% for a minimized latency threshold to be a minimized latency wireless link.

6. The information handling system of claim 1 further comprising:

the network interface device to receive a dock backhaul connectivity score describing network connectivity performance metrics for one or more docking backhaul links between the docking station and the wireless AP; and the processor to determine the dock backhaul connectivity score meets a threshold percentage value of 70% for a minimized latency threshold to be a minimized latency wireless link.

7. The information handling system of claim 1 further comprising:

the network interface device to receive a dock backhaul connectivity score describing network connectivity performance metrics for one or more docking backhaul links between the docking station and the wireless AP;

the processor, executing code instructions of a link scoring system, to determine a test backhaul connectivity score describing network connectivity performance metrics for one or more test backhaul wireless links between the information handling system and the AP, and a test docking connectivity score describing network connectivity performance metrics for a test docking link between the information handling system and the docking station; and the processor to identify the optimized wireless link configuration based on the dock backhaul connectivity score, the test backhaul connectivity score, the test docking connectivity score, and a ranking of the one or more latency-sensitive software applications based on prioritization of each of the latency-sensitive software applications to minimizing latency for optimal performance.

8. A method of dock assisted dual-band simultaneous (DBS) communication diversity management comprising:

identifying a plurality of software applications currently executing at a processor based and determining a throughput-sensitive software application from the the plurality of software applications for prioritization with a first high throughput wireless link for communications of data from the throughput-sensitive software application;

identifying an optimized wireless link configuration dedicating each of a plurality of optimized links between the information handling system and a network access point (AP), or between the information handling system and the docking station to electronic communications transceived pursuant to execution of the plurality of software applications and selecting one high throughput wireless link to provide high throughput data communications for the throughput-sensitive software application;

directing the network interface device, via a controller, to establish the plurality of optimized links with the AP and the docking station according to the optimized wireless link configuration, wherein the plurality of optimized links includes at least one high throughput wireless link to each of the docking station and the AP to balance high throughput traffic across each of the plurality of optimized links; and transceiving data, via a network interface device, with the AP and the docking station via the plurality of optimized links.

9. The method of claim 8, wherein the network interface device supports DBS communication, and the optimized wireless link configuration includes one high throughput wireless link between the information handling system and the docking station, taking advantage of a relatively higher throughput docking backhaul link between the docking station and the AP.

10. The method of claim 8, wherein the network interface device is incompatible with DBS communication, and the optimized wireless link configuration includes one high throughput wireless link between the information handling system and the docking station, taking advantage of a relatively higher throughput docking backhaul link between the docking station and the AP.

11. The method of claim 8 further comprising:

distributing, pursuant to code instructions of a packet processing management system, packets transceived during execution of the plurality of software applications with the high-throughput sensitive software application prioritized to use a plurality of high throughput wireless links, across the plurality of optimized links to optimize throughput at each of the plurality of optimized links, wherein the AP supports link aggregation.

12. The method of claim 8 further comprising:

dedicating each of the plurality of optimized links to electronic communications transceived pursuant to execution of one of the plurality of software applications including prioritizing the throughput sensitive software application to a high throughput wireless link among the plurality of optimized wireless links.

13. The method of claim 8 further comprising:

determining, via a processor, a test docking connectivity score describing network connectivity performance metrics for a test docking link between the information handling system and the docking station meets a threshold percentage value of 70%.

14. The method of claim 8 further comprising:

receiving a dock backhaul connectivity score, via the network interface device, describing network connectivity performance metrics for one or more docking backhaul links between the docking station and the wireless AP; and determining the dock backhaul connectivity score meets a threshold percentage value of 70%.

15. An information handling system operating a dock assisted dual-band simultaneous (DBS) communication diversity system comprising:

a network interface device to receive a dock backhaul connectivity score describing network connectivity performance metrics for accessing a network via a docking backhaul link between the docking station and the wireless Access Point (AP);

a processor, executing code instructions of a link scoring system, to determine a test backhaul connectivity score describing network connectivity performance metrics for a test backhaul wireless link between the information handling system and the AP;

the processor, executing code instructions of the dock assisted DBS communication diversity system, to identify a latency-sensitive software application and a throughput-sensitive software application among a plurality of software applications executing on a client information handling system and selecting an optimized link configuration dedicating a first minimized latency wireless link between the information handling system and the AP to electronic communications transceived pursuant to execution of the latency-sensitive software application in priority of other executing software applications and dedicating a second high throughput wireless link between the information handling system and the docking station to electronic communications transceived pursuant to execution of a throughput-sensitive software application;

the network interface device to transceive data with the AP via the first minimized latency wireless link to decrease a number of wireless hops required to transceive packets from the information handling system to the AP and correspondingly decrease latency for data communications from the latency-sensitive software application; and the network interface device to transceive data with the docking station via the second high throughput wireless link to access the network via the docking backhaul link between the docking station and the wireless AP for the throughput-sensitive software application, wherein the test backhaul connectivity score is lesser than the dock backhaul connectivity score.

16. The information handling system of claim 15 further comprising:
the processor executing code instructions of a diagnostic analysis application to identify the latency-sensitive software application and the throughput-sensitive software application, both currently executing at the processor, and prioritizing the latency-sensitive software application for the first minimized latency wireless link to minimize latency in communications from the latency-sensitive software application data and prioritizing of the throughput-sensitive software application to the high throughput wireless link for in communications from the throughput-sensitive software application.

17. The information handling system of claim 15, wherein the first minimized latency wireless link transceives data wirelessly within the 60 GHz radio frequency spectrum, and the second high throughput wireless link transceives data wirelessly within the 2.4 GHz radio frequency spectrum.

18. The information handling system of claim 15, wherein the first minimized latency wireless link transceives data wirelessly within the 2.4 GHz radio frequency spectrum, and the second high throughput wireless link transceives data wirelessly within the 5 GHz radio frequency spectrum.

19. The information handling system of claim 15, wherein the first minimized latency wireless link transceives data wirelessly within the 2.4 GHz radio frequency spectrum, and the second high throughput wireless link transceives data wirelessly within the 60 GHz radio frequency spectrum.

20. The information handling system of claim 15, wherein the first minimized latency wireless link transceives data wirelessly within the 5 GHz radio frequency spectrum, and the second high throughput wireless link transceives data wirelessly within the 2.4 GHz radio frequency spectrum.

* * * * *